(12) United States Patent
Shimamura et al.

(10) Patent No.: US 7,431,834 B2
(45) Date of Patent: Oct. 7, 2008

(54) WASTE WATER AND SLUDGE TREATMENT APPARATUS

(75) Inventors: Kazuaki Shimamura, Tokyo (JP); Takao Hagino, Tokyo (JP); Hideyuki Ishikawa, Tokyo (JP); Yuichi Fuchu, Tokyo (JP)

(73) Assignee: Ebara Corporation, Tokyo (JP)

( * ) Notice: Subject to any disclaimer, the term of this patent is extended or adjusted under 35 U.S.C. 154(b) by 66 days.

(21) Appl. No.: 11/404,853

(22) Filed: Apr. 17, 2006

(65) Prior Publication Data

US 2007/0241041 A1   Oct. 18, 2007

(51) Int. Cl.
*C02F 3/12* (2006.01)

(52) U.S. Cl. .................... 210/194; 210/195.1; 210/196; 210/512.2

(58) Field of Classification Search .................. 210/194, 210/195.1, 196, 512.2
See application file for complete search history.

(56) References Cited

U.S. PATENT DOCUMENTS 7,153,436 B2 *  12/2006  Bair et al. .................... 210/709

* cited by examiner

*Primary Examiner*—Chester T. Barry
(74) *Attorney, Agent, or Firm*—Wenderoth, Lind & Ponack, L.L.P.

(57) ABSTRACT

In a system for separating crystals from sludge, or from separated water generated when sludge is subjected to a concentration process or a dewatering process, aspects of both phosphorus removal and phosphorus recovery can be satisfied, MAP having a high degree of purity can be recovered, and stable treatment can be performed such that the MAP recovery rate is high and blockages of a hydrocyclone do not occur. An aspect of the present invention is a crystal separation apparatus for separating crystals from sludge, or from separated water generated when sludge is subjected to a concentration process or a dewatering process, comprising a hydrocyclone for separating the crystals from the sludge or separated water introduced into the hydrocyclone, and a return pipe A for returning the sludge or separated water which flows out from an overflow riser of the hydrocyclone to a sludge or separated water introduction portion of the hydrocyclone.

12 Claims, 17 Drawing Sheets

RELATIONSHIP BETWEEN MAP
CONCENTRATION IN REACTOR AND
PHOSPHORUS RECOVERY RATE

RELATIONSHIP BETWEEN CIRCULATION RATIO (CIRCULATED WATER AMOUNT/INTRODUCED WATER AMOUNT)

AND CYCLONE INTRODUCTION PARTICLE CONCENTRATION

WASTE WATER AND SLUDGE TREATMENT APPARATUS

BACKGROUND OF THE INVENTION

1. Field of the Invention

The present invention relates to an apparatus and method for separating and concentrating crystals from anaerobic or aerobic sludge, separated water generated when sludge is subjected to a concentration process or dewatering process, or various kinds of waste water. The present invention also relates to an apparatus and method for treating digested sludge generated when organic waste matter or waste water is subjected to anaerobic digestion.

2. Description of the Related Art

In a treatment facility for treating organic waste water containing phosphorus and nitrogen, such as sewage, waste water, and screen, first the raw sludge (also referred to as preliminary sludge hereafter) is subjected to liquid/solid separation in a preliminary sedimentation tank, whereupon the separated supernatant liquid is subjected to activated sludge treatment to remove organic matter. During the activated sludge treatment, the multiplied activated sludge is discharged as excess sludge. Incidentally, when raw sludge or organic waste matter such as excess sludge, screen, or raw refuse is subjected to anaerobic digestion, the organic matter in the waste matter is broken down by the action of acidogenic bacteria and methanogenic bacteria, as a result of which the amount of sludge is reduced and gas containing methane, carbon dioxide, and the like is generated together with waste water having high nitrogen and phosphorus concentrations. Nowadays, a great deal of research is being conducted into the utilization of generated methane gas as a heat source, as well as the generation of MAP from digested sludge liquor obtained through the dewatering of digested sludge and the effective use of this MAP in fertilizers, chemical raw materials, and so on (Japanese Unexamined Patent Application Publication 2003-117306).

Moreover, improvements are currently being made in the efficiency of anaerobic digestion tanks in the areas of energy recovery and sludge reduction. For example, by subjecting raw sludge, excess sludge, or mixed sludge containing both raw sludge and excess sludge to physical/mechanical treatment, chemical liquefaction treatment, heat treatment, and so on such that the sludge is solubilized, improvements have been achieved in the methane gas recovery rate and sludge reduction rate during a subsequent anaerobic digestion process. The aforementioned physical/mechanical treatment includes ultrasonic treatment and crushing using a mill. Chemical liquefaction treatment includes treatment using ozone, hydrogen peroxide, acid, and alkali. Heat treatment includes treatment using thermophilic bacteria. For example, Japanese Unexamined Patent Application Publication 2002-336898 describes a method of solubilizing sludge by treating the sludge in an ultrasonic treatment process.

As the efficiency of anaerobic digestion increases in the manner described above, waste water having ever higher nitrogen and phosphorus concentrations is produced. Originally, organic waste matter contains elements such as nitrogen, phosphorus, and also magnesium and the like, and when the organic waste matter is solubilized, these elements migrate into the solution. When waste water containing such high concentrations of nitrogen and phosphorus is returned to a water treatment system, the nitrogen and phosphorus loads on the water treatment system increase, causing deterioration in the quality of the treated water.

Hence, in a known technique, MAP is generated by subjecting the digested sludge or digested sludge liquor to aeration treatment, and a part of the sludge that settles in the sedimentation tank is returned to the aeration tank to serve as seed crystals. In so doing, the phosphorus concentration of the return water decreases, and the phosphorus can be recovered easily as MAP. In Japanese Examined Patent Application Publication H7-115979, digested sludge is decarbonated, whereupon a magnesium compound is added to precipitate MAP, thereby reducing the phosphorus concentration of the dewatered separated liquid. In both cases, the phosphorus concentration of the liquid is reduced by precipitating MAP, and as a result, phosphorus can be prevented from circulating endlessly between water treatment process and sludge treatment process.

Nowadays, in order to achieve effective utilization and efficient treatment of digested sludge, in some regions, all wastewater treatment plants and the like are connected by sewers (pipes), and generated digested sludge is transported through the sewers, gathered at a single treatment plant, and treated collectively in the single treatment plant. Similarly, in order to treat the separated liquid that is generated by dewatering digested sludge efficiently, in some regions, all wastewater treatment plants and the like are connected by sewers, and the generated separated liquid is transported through the sewers to be treated collectively in a single treatment plant. The construction cost of the sewers is cheaper than that of a treatment facility, and since the advantage of scale applies to sludge treatment facilities (i.e. the unit cost thereof decreases as the scale increases), sewers are considered to be more economical in locations such as urban areas, where residential buildings are in close proximity.

However, when digested sludge or the separated liquid thereof is transported through pipes, so-called MAP precipitate is generated when the magnesium ions of the sludge chemically combine with the phosphate ions and ammonium ions, leading to possible blockages of the sludge pipe.

To solve this problem, a method of transporting the sludge through a sludge pipe after removing and recovering the MAP by aerating the digested sludge in a reactor in advance to generate MAP particles, and then subjecting the sludge containing the MAP particles to centrifugal separation, is known. Further, a part or all of the MAP particles is returned to the reactor following centrifugal separation to serve as kernels for generating new MAP particles in the reactor. By performing such an operation, problems such as blockages of the sludge pipes caused by MAP particles can be avoided.

As noted above, as the efficiency of anaerobic digestion increases, waste water having ever higher nitrogen and phosphorus concentrations is produced. Originally, organic waste matter contains elements such as nitrogen, phosphorus, and also magnesium and the like, and when the organic waste matter is solubilized, these elements migrate into the solution. Nitrogen, phosphorus, and magnesium are the constituent components of MAP, and at high concentrations in liquid, or when the pH rises, the nitrogen, phosphorus, and magnesium easily equal or exceed the solubility product of the MAP such that the MAP precipitates spontaneously in a digestion tank. When the MAP precipitates into a draft tube in the digestion tank, the flow of the digested sludge deteriorates, and scale trouble such as pipe blockages during pump extraction occurs frequently. Moreover, the MAP is disposed of together with the dewatered sludge rather than being recovered, and hence there is demand for an efficient MAP recovery method.

When MAP is precipitated by decarbonating the digested sludge or adding a magnesium compound thereto, the phosphorus concentration of the dewatered separated liquid decreases, and therefore the phosphorus load on the water treatment system is reduced so that the treated water can be maintained at a favorable quality. However, this method focuses on phosphorus removal rather than the recovery of phosphorus resources, and hence there is demand for a treatment method which satisfies aspects of both phosphorus removal and phosphorus recovery.

Moreover, when MAP is recovered through aeration and centrifugal separation, the recovered matter contains digested sludge and screen residue as well as the MAP, and hence it is not always possible to recover MAP having a high degree of purity. When recycling phosphorus, purity is required, and hence there is demand for a method of recovering MAP having a high degree of purity.

Furthermore, when MAP is recovered by subjecting the MAP to centrifugal separation using a hydrocyclone and the concentration of MAP or other inorganic solids introduced into the hydrocyclone is high, the hydrocyclone itself may become blocked. In certain cases, the MAP concentration in an overflow riser may also increase, leading to deterioration in the recovery rate. Hence, there is demand for a separating method enabling treatment to be performed with stability and a high MAP recovery rate.

Further, when digested sludge containing MAP is transported by pipe to a facility for treating sludge collectively, a large amount of MAP scale is generated in the pipe, leading to deterioration in the efficiency with which the sludge is transported. Following its initial generation, MAP scale continues to grow. If MAP scale is left on the inside of the pipe, the entire sewer eventually becomes covered in MAP scale, making sludge transportation difficult, and hence cleaning and complicated maintenance must be performed periodically.

Nowadays, due to the increase in sewerage, advancements in advanced treatment, and so on, the amount of sewage-treated sludge is increasing. In order to detoxify and solubilize the sludge, sludge smelting treatment is becoming more widely used. However, when sewage sludge is subjected to smelting treatment at a high temperature between 1200 and 1400° C., a part of the phosphorus contained in the sludge is emitted into the slag without solidifying, and as a result, the phosphorus becomes stuck during an exhaust gas treatment process, leading to problems such as machinery corrosion, an increase in the phosphorus load of the return water produced by exhaust gas wet cleaning, and so on. Hence, there is demand for a technique for removing phosphorus from sludge in advance.

As for crystallization reactors, when attempts have been made in the past to reduce the size of the crystallization reactor, the concentration ability of the hydrocyclone has posed a problem since it becomes difficult to maintain the MAP in the crystallization reactor at a high concentration.

SUMMARY OF THE INVENTION

An object of the present invention is to solve the problems illustrated above by providing a treatment method and apparatus which satisfy aspects of both phosphorus removal and phosphorus recovery, enable the recovery of MAP having a high degree of purity, and enable stable treatment in which the MAP recovery rate is high and blockages of a hydrocyclone do not occur.

The present invention may be applied not only to the separation and recovery of MAP crystals from anaerobically digested sludge and the like, as described above, but also to the separation and recovery of various types of crystal from various types of waste water. For example, the present invention may be applied to the recovery of calcium phosphate ($Ca_3(PO_4)_2$) crystals or hydroxyapatite ($Ca_{10}(PO_4)_6(OH)_2$: HAP) crystals from waste water such as return water obtained from the secondary treated water of sewage or a sludge treatment system; the recovery of calcium fluoride ($CaF_2$) crystals from the waste water of a semiconductor factory or the like; the recovery of calcium carbonate crystals from service water using ground water as a raw water, waste water, and refuse leachate; the recovery of calcium carbonate ($CaCO_3$) crystals from hard water containing a large amount of carbonate ions; the recovery of manganese carbonate ($MnCO_3$) crystals generated from Mn in the form of an impurity contained in running tap water; and so on.

This specification mainly describes an example in which MAP crystals are separated and recovered from anaerobically digested sludge and the like.

As means for achieving the object described above, an aspect of the present invention provides the crystal separation apparatus illustrated below.

According to one aspect of the present invention, there is provided a crystal separation apparatus for separating crystals from sludge, or from separated water generated when sludge is subjected to a concentration process or a dewatering process, comprising a hydrocyclone for separating the crystals from the sludge or separated water introduced into the hydrocyclone and a return pipe A for returning the sludge or separated water which flows out from an overflow riser of the hydrocyclone to a sludge or separated water introduction portion of the hydrocyclone.

According to another aspect of the present invention, there is provided the crystal separation apparatus as defined hereinbefore, wherein a crystallization reactor for precipitating the crystals by adding a chemical to the sludge or separated water is provided before the. The apparatus further comprises a return pipe B for returning all or a part of the crystals separated by the hydrocyclone to the crystallization reactor.

According to another aspect of the present invention, there is provided a crystal separation apparatus for separating crystals from sludge, or from separated water generated when sludge is subjected to a concentration process or a dewatering process, comprising a crystallization reactor for precipitating the crystals by adding a chemical to the sludge or separated water, a hydrocyclone for separating the crystals from the sludge or separated water introduced into the hydrocyclone after being treated by the crystallization reactor and a return pipe C for returning the sludge or separated water which flows out from an overflow riser of the hydrocyclone to the crystallization reactor.

According to another aspect of the present invention, there is provided the crystal separation apparatus as defined hereinbefore, further comprising a return pipe A for returning the sludge or separated water which flows out from the overflow riser of the hydrocyclone to a sludge or separated water introduction portion of the hydrocyclone.

According to another aspect of the present invention, there is provided the crystal separation apparatus as defined hereinbefore, further comprising a return pipe B for returning all or a part of the crystals separated by the hydrocyclone to the crystallization reactor.

According to another aspect of the present invention, there is provided the crystal separation apparatus as defined hereinbefore, further comprising an extraction pipe for extracting the crystals deposited on a base portion of the crystallization reactor to the exterior of the system. When an amount of the sludge or raw water to be supplied to the crystallization reactor is Q1, an amount of the chemical to be added to the crystallization reactor is Q2, an amount of the crystals separated by the hydrocyclone to be returned to the crystallization reactor is Q3, and an amount of the crystals to be extracted via the extraction pipe is Q4, Q1+Q2+Q3<Q4.

According to another aspect of the present invention, there is provided the crystal separation apparatus as defined hereinbefore, wherein a surface area of a plane cross section of the base portion of the crystallization reactor is smaller than a surface area of a plane cross section of an upper end of the crystallization reactor.

According to another aspect of the present invention, there is provided the crystal separation apparatus as defined hereinbefore, wherein a recovery pipe for recovering the crystals separated or concentrated by the hydrocyclone is connected to a base portion of the hydrocyclone.

According to another aspect of the present invention, there is provided the crystal separation apparatus as defined hereinbefore, wherein a cleaning pipe for cleaning the hydrocyclone is connected to the return pipe C or the recovery pipe.

According to another aspect of the present invention, there is provided a crystal separation apparatus for separating crystals from sludge, or from separated water generated when sludge is subjected to a concentration process or a dewatering process, comprising a crystallization reactor for precipitating the crystals by adding a chemical to the sludge or separated water, a plurality of hydrocyclones arranged in series for separating the crystals from the sludge or separated water introduced into the hydrocyclones after being treated by the crystallization reactor and a return pipe B for returning all or a part of the crystals separated or concentrated by the hydrocyclones to the crystallization reactor.

According to another aspect of the present invention, there is provided the crystal separation apparatus as defined hereinbefore, wherein a flow meter for measuring a flow rate of the sludge or separated water is disposed in a pipe for introducing the sludge or separated water into the crystallization reactor. The apparatus further comprises means for determining a number of hydrocyclones to be operated from a relationship between a measured value of the flow meter, a preset flow rate range, and a number of operational hydrocyclones.

According to another aspect of the present invention, there is provided the crystal separation apparatus as defined hereinbefore, wherein a sludge concentration meter is disposed in the crystallization reactor, and the apparatus further comprises means for determining a number of hydrocyclones to be operated in accordance with a detection value of the sludge concentration meter.

According to another aspect of the present invention, there is provided the crystal separation apparatus as defined hereinbefore, further comprising means for monitoring a phosphorus concentration and a pH value of the sludge or separated water treated by the crystallization reactor and the hydrocyclones, means for calculating a supersaturation ratio on the basis of the phosphorus concentration and the pH value measured by the monitoring means and means for determining an amount of magnesium to be added and a number of hydrocyclones to be operated in accordance with the supersaturation ratio.

According to another aspect of the present invention, the crystal separation apparatus as defined hereinbefore, further comprising a screen residue removal apparatus disposed before said crystallization reactor or between the crystallization reactor and the hydrocyclone, means for monitoring a phosphorus concentration and a pH value of said sludge or separated water treated by the crystallization reactor, the hydrocyclones and said crystallization reactor, means for calculating a supersaturation ratio on the basis of the phosphorus concentration and the pH value measured by the monitoring means and means for determining an amount of magnesium to be added and a number of hydrocyclones to be operated in accordance with the supersaturation ratio.

DESCRIPTION OF THE PREFERRED EMBODIMENTS

Figure 1:
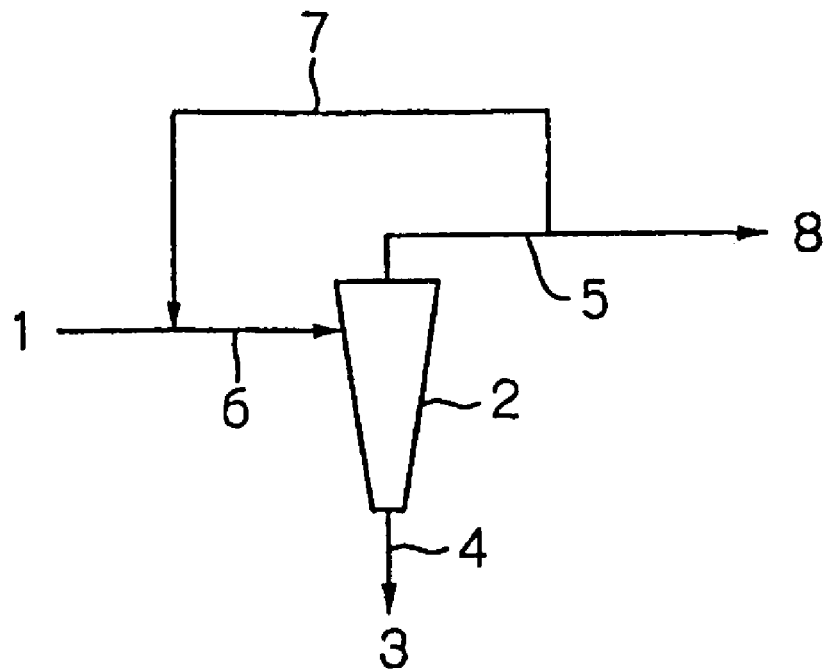
FIG. 1 is a treatment flow diagram pertaining to an embodiment of the present invention.

Embodiments of the present invention will now be described in detail with reference to the drawings. However, it is to be understood that the present invention is not limited to these embodiments. As noted above, the present invention may be applied to the separation and recovery of various types of crystal from various types of waste water, but in the following description, an example is mainly used in which MAP crystals are separated and recovered from anaerobically digested sludge or the like.

In the drawings, constitutional elements having identical functions may be described using identical reference numerals. Furthermore, where appropriate, description relating to constitutional elements having identical functions has been omitted. The technical matter relating to each constitutional element described in relation to the flow of each drawing may be applied to identical constitutional elements in the flows of the other drawings.

Examples of the MAP-containing sludge which is treated in the present invention include screen, treatment tank sludge, sewerage sludge, agricultural sludge, livestock waste, raw refuse, and food waste. The organic waste matter is typically in liquid slurry form, or has a high moisture content when in solid form. To enable smooth treatment, it is preferable to introduce waste water or the like into non-slurry form waste matter such that the waste matter is treated in slurry form. The present invention may also be applied to separated water obtained by concentrating or dewatering the sludge. In the following description, an example will be used in which sludge obtained by subjecting excess sewerage sludge to anaerobic digestion is employed as the MAP-containing sludge.

FIG. 1 shows a treatment flow in which anaerobically digested sludge is used as raw sludge 1, MAP 3 in the sludge 1 is concentrated using a hydrocyclone 2 and discharged via a micro-particle discharge pipe 4, and the sludge from which the MAP 3 has been removed is caused to overflow through a sludge discharge pipe (also referred to as an overflow riser) 5.

The lower portion structure of the hydrocyclone 2 shown in FIG. 1 takes an inverted conical form with a hydrocyclone inflow pipe 6 (also referred to as an introduction pipe) provided on the side portion, the micro-particle discharge pipe 4 provided on the lower portion, and the overflow riser 5 provided on the upper portion. In the hydrocyclone 2, the digested sludge 1 containing the MAP 3 is transmitted through the hydrocyclone inflow pipe 6 by the pressure of a pump, and is then caused to swirl down the inverted cone-shaped wall surface in the interior of the hydrocyclone 2. Micro-particles containing the MAP 3, which have a greater specific gravity than the digested sludge, are collected and concentrated on a lower wall surface side by means of centrifugal force. The concentrated micro-particles are discharged either continuously or intermittently from the micro-particle discharge pipe 4. Further, sludge (treated sludge) 8 from which the micro-particles containing the MAP 3 have been removed is extracted through the overflow riser 5 and discharged.

The pipe diameter of the micro-particle discharge pipe 4 and the pipe diameter of the overflow riser (sludge discharge pipe) 5 may be altered, and by altering both, the flow rate and particle diameter distribution can be varied.

In the present invention, the sludge that flows out of the sludge discharge pipe of the hydrocyclone 2 is returned to the hydrocyclone inflow pipe 6 through a treated sludge return pipe 7 (return pipe A). The return amount may be set to a desired proportion of the raw sludge 1 introduction amount, but the return amount is preferably determined such that the MAP concentration of the sludge introduced into the hydrocyclone remains at or below a predetermined concentration, and the set value thereof is preferably varied according to the size of the hydrocyclone 2, the diameter of the sludge discharge pipe, and the diameter of the micro-particle discharge pipe. The micro-particle discharge speed in relation to the sectional area of the micro-particle discharge pipe ($kg/mm^2/hr$) is a particularly important factor in determining whether or not the hydrocyclone will become blocked since the hydrocyclone becomes blocked when the discharge speed reaches or exceeds a certain speed. For example, a two-inch hydrocyclone becomes blocked at approximately 10 $kg/mm^2/hr$ or more, although this differs according to factors such as the introduction pressure and the shape of the hydrocyclone, and therefore the concentration of the MAP-containing micro-particles in the hydrocyclone inflow pipe is preferably reduced such that the micro-particle discharge speed is no greater than 5 $kg/mm^2/hr$, and more preferably no greater than 2 $kg/mm^2/hr$.

As will be described below in Example 3, the treated sludge return amount is preferably no less than 0.1 times the amount of introduced raw sludge 1, and although there is no specific upper limit, the return amount is preferably set to no more than 50 times the amount of introduced raw sludge 1 in order to achieve an economical circulation ratio.

The sludge that flows out of the sludge discharge pipe 5 may be returned to the cyclone inflow pipe 6 after being stored temporarily in a storage tank (not shown), or may be returned without passing through the storage tank. The remaining sludge is recovered as the treated sludge 8 and applied appropriately to a dewatering process or the like.

By returning the treated sludge that flows out from the overflow riser of the hydrocyclone to the cyclone inflow pipe in this manner, the concentration of the MAP-containing micro-particles in the cyclone inflow pipe decreases, and as a result, blockages of the cyclone can be prevented. Moreover, by reducing the concentration of the MAP-containing micro-particles in the cyclone inflow pipe, the MAP concentration of the sludge that is discharged through the overflow riser also decreases, and thus the MAP recovery rate improves.

Figure 2:
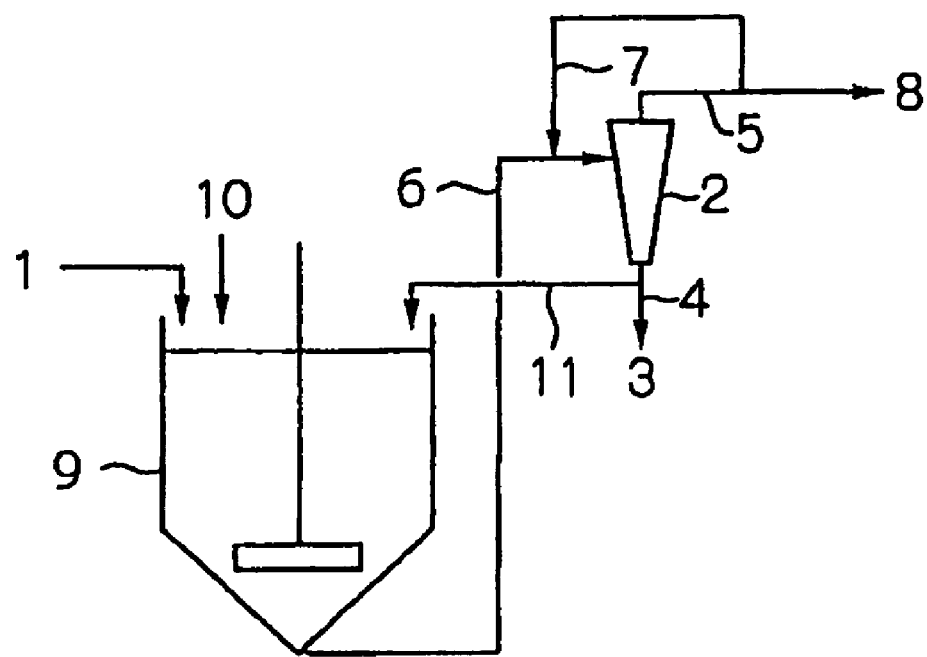
FIG. 2 is a treatment flow diagram pertaining to an embodiment of the present invention.

FIG. 2 shows the treatment flow of another embodiment of the present invention, constituted by a crystallization reactor 9 and the hydrocyclone 2.

In the crystallization reactor 9, MAP is precipitated by adding a magnesium compound 10 serving as a crystallization chemical to the digested sludge and digested sludge liquor 1 extracted from the anaerobic digestion tank, and by causing the magnesium compound 10 to react with $PO_4$—P dissolved in the liquid. If aeration, decompression, or a similar process is also performed at this time, the sludge is decarbonated, leading to an increase in the pH, and hence MAP can be precipitated more efficiently. Needless to say, a chemical such as sodium hydroxide, magnesium hydroxide, or magnesium oxide may be added to raise the pH. As the added magnesium compound 10, magnesium chloride, magnesium hydroxide, magnesium oxide, sea water, and so on may be used. As regards the amount of added magnesium, a molar ratio between 0.1 and 10, preferably between 0.5 and 3.0, and more preferably between 0.8 and 1.2 in relation to the aqueous orthophosphoric acid concentration of the digested sludge is suitable. The pH in the reaction may be between 7.0 and 11.0, and preferably between 7.5 and 8.5.

Seed crystals are preferably added to the crystallization reactor 9 to ensure that MAP is precipitated efficiently. The MAP precipitated by the crystallization reactor 9 or MAP precipitated in a separate reactor may be used as the seed crystals. Alternatively, MAP that precipitates spontaneously in the digestion tank may be used.

Micro-particles or the like containing the MAP 3, which are recovered by the hydrocyclone 2, may also be used. In this case, the micro-particles that are separated and recovered by the hydrocyclone 2 may be returned to the crystallization reactor 9 through a return pipe 11 (return pipe B). When separated water from the separation process, effluent water, or the like contains MAP, each of them may also be used.

Alternatively, a powder or granular substance such as rock phosphate, dolomite, bone charcoal, activated carbon, silica sand, or calcium silicate may be used. The particle diameter of the seed crystals is arbitrary, but is preferably set between 0.05 and 3.0 mm, and more preferably between 0.1 and 0.5 mm. By precipitating new MAP on the surface of the seed crystals, subsequent separation of the digested sludge and MAP 3 in the hydrocyclone 2 can be performed favorably. The seed crystal charging amount is extremely important for precipitating MAP on the surface of the seed crystals. The charging amount is determined in consideration of the introduced phosphorus amount and the seed crystal particle diameter such that the phosphorus introduction amount in relation to the seed crystal surface area (the phosphorus surface area load hereafter) is no more than 100 g-P/m$^2$/d, preferably no more than 30 g-P/m$^2$/d, and more preferably no more than 10 g-P/m$^2$/d. In other words, when a high concentration of MAP is maintained in the reactor 9 in relation to a constant particle diameter, the volume of the reactor can be reduced, enabling a reduction in initial costs.

There are no particular limitations on the form of the reactor 9 used in the crystallization process, and a complete mixing type reactor comprising a mechanical stirring apparatus, a jet stream type stirring reactor using a pump, a fluidized bed reactor charged with seed crystals at a high density, an internal circulation type reactor comprising a draft tube, an external circulation type reactor, or another reactor may be used.

The MAP precipitated in the crystallization process is extracted from the base portion of the crystallization reactor 9, introduced into the aforementioned hydrocyclone 2 through the hydrocyclone inflow pipe 6, and subjected to separation and recovery in the hydrocyclone 2. In this case also, the sludge that flows out from the overflow riser 5 of the hydrocyclone 2 is returned to the hydrocyclone inflow pipe 6 through the return pipe 7 (return pipe A). By diluting the MAP concentration, which was maintained at a high level in the crystallization process, with the treated sludge 8, blockage of the cyclone 2 can be prevented, and a stable treatment performance with a high MAP recovery rate can be obtained. Note that in FIG. 2, 10 denotes a Mg compound. An Mg compound for generating MAP is added to the crystallization reactor, and therefore MAP generation occurs in the crystallization reactor 9. Sludge may be introduced into the hydrocyclone 2 either continuously or intermittently.

Figure 3:
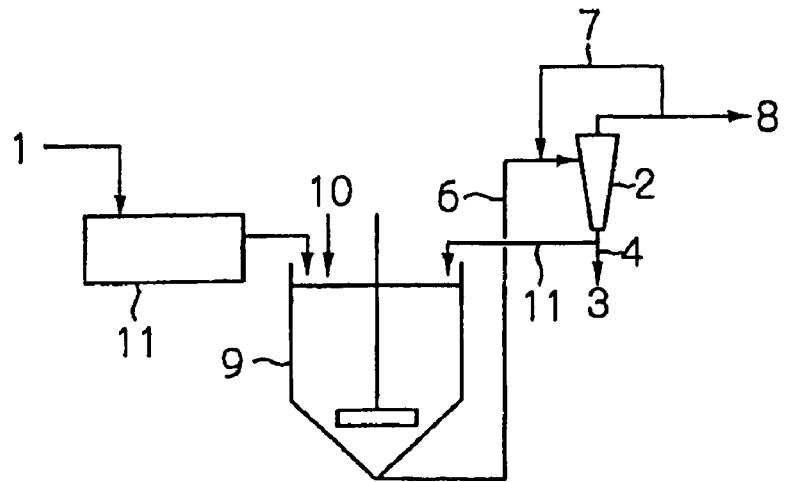
FIG. 3 is a treatment flow diagram pertaining to an embodiment of the present invention.

FIG. 3 is a flow diagram showing an example of another embodiment of the present invention, in which a screen residue removal apparatus 11 is provided before the sludge 1 is introduced into the hydrocyclone 2. Conventionally, no screen residue separation process is provided, and therefore problems such as blockages caused by screen residue and the like occur in the downstream hydrocyclone 2. As a result, long-term stable treatment is difficult. In the present invention, screen residue is removed, enabling a dramatic improvement in the stability of MAP particle separation using the hydrocyclone. Moreover, by separating screen residue in advance, MAP with a high degree of purity can be obtained. The screen residue removal apparatus 11 may also be attached midway along the hydrocyclone inflow pipe 6.

The removed screen residue may be discharged outside of the system or introduced into a dewatering process for dewatering the treated sludge 8. In the latter case, the dewatering performance is preferably enhanced.

The crystallization process and the screen residue separation process may performed in any order. The crystallization process may precede the screen residue separation process, or the screen residue separation process may precede the crystallization process.

A method for separating the screen residue may employ a centrifugal settler, a sedimentation tank employing gravity separation, and so on, and a micro-particle separation method using differences in particle diameter may employ a vibrating screen, a drum screen, a filter layer, a classification layer type separation layer, and so on.

Figure 4:
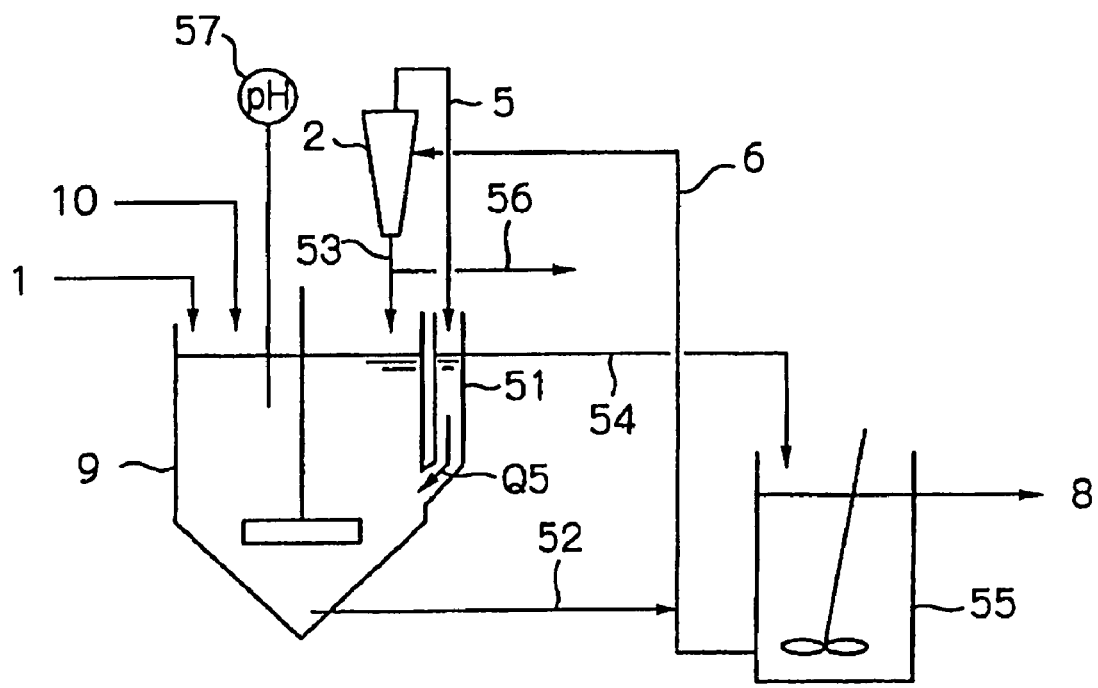
FIG. 4 is a treatment flow diagram pertaining to an embodiment of the present invention.
Figure 5:
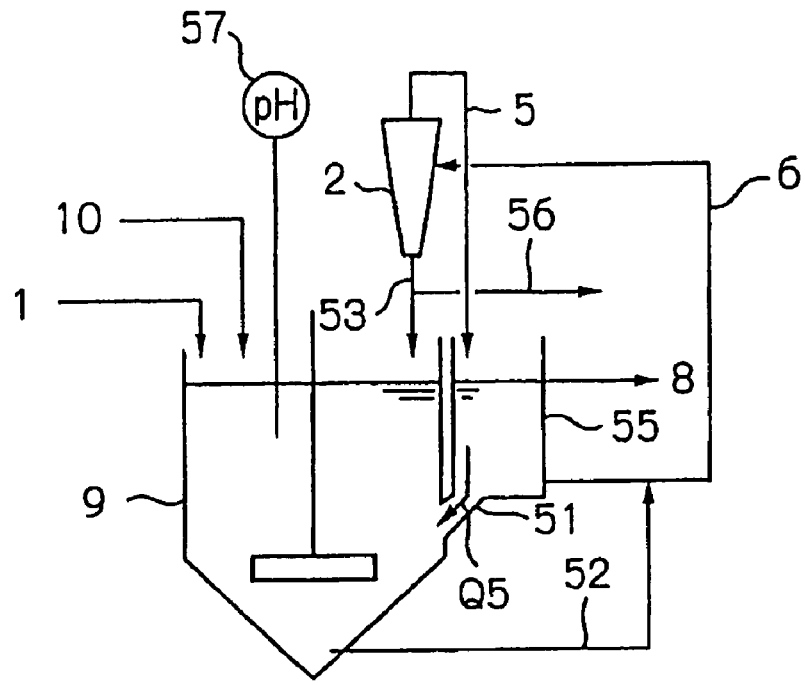
FIG. 5 is a treatment flow diagram pertaining to an embodiment of the present invention.
Figure 6:
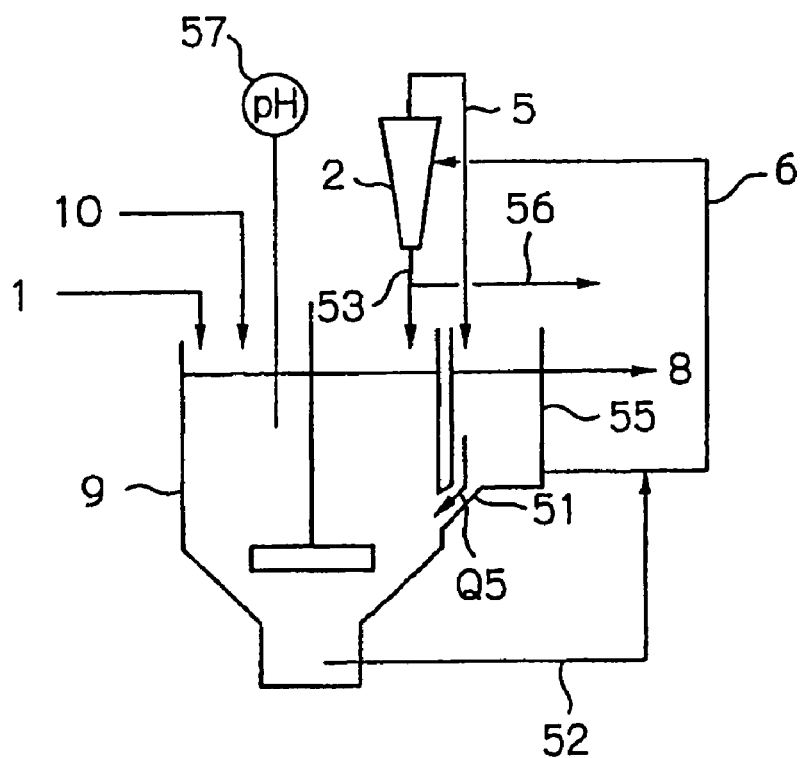
FIG. 6 is a treatment flow diagram pertaining to an embodiment of the present invention.

A further embodiment of the present invention is illustrated in FIGS. 4 through 6.

FIG. 4 shows a treatment flow constituted by the crystallization reactor 9 comprising a stirring apparatus, the hydrocyclone 2, and a circulating water tank 55.

To ensure that the particles and liquid are mixed together well in the crystallization reactor 9, stirring is preferably performed to maintain a favorable particle current. The stirring method may employ a mechanical stirring apparatus equipped with a motor, or stirring may be performed with the use of an air supply.

The crystallization reactor 9 is connected to a raw water 1 supply pipe, a chemical 10 supply pipe, a return pipe 51 whose lower portion communicates with the reactor, an extraction pipe 52 for extracting sludge and particles from the interior of the reactor, and a discharge pipe 53 for discharging micro-particles from the hydrocyclone, while a circulating water effluent pipe 54 is connected to the return pipe 51. The sludge of the raw water contains between 100 and 600 mg/L of phosphate ions, and between 50 and 3000 mg/L of ammonia nitrogen. A magnesium source for generating MAP is supplied as the chemical 10. Magnesium chloride, magnesium hydroxide, magnesium oxide, and so on may be employed as the magnesium source.

The crystallization reactor 9 is preferably structured such that the surface area of its base portion planar cross section is smaller than the surface area of its top end planar cross section. Furthermore, the planar cross section from the top end to a predetermined lower position preferably has a constant shape and a constant sectional area, and from the predetermined position downward, the cross section preferably decreases steadily.

As shown in FIG. 4, for example, the base portion preferably takes an inverted conical form. The angle of the inverted cone is preferably no less than 45° in relation to the horizontal, and more preferably no less than 60°. By setting the angle in this manner, the MAP particles which settle inside the crystallization reactor 9 become concentrated at a single point in the base portion of the reactor, which is preferable. Furthermore, the particle extraction pipe 52 is preferably connected to the vicinity of the point at which the settled particles concentrate. As a result, blockages caused by sediment can be prevented.

The micro-particle discharge pipe 53 of the hydrocyclone 2 is used to discharge the MAP particles that are concentrated by the hydrocyclone 2 from the base portion of the hydrocyclone 2 and to return these MAP particles to the crystallization reactor 9. By returning the MAP particles concentrated by the hydrocyclone 2 to the crystallization reactor 9, the MAP particle concentration in the reactor can be raised, and as a result, the MAP particle surface area can be maintained at a high level. The crystallization reaction is constituted by a particle nucleation phenomenon and a growth phenomenon, but as the particle surface area increases, the growth phenomenon takes precedence over the nucleation phenomenon, thereby facilitating solid/liquid separation. A recovery pipe 56 for recovering the concentrated MAP particles may also be connected to the base portion of the hydrocyclone 2 or the micro-particle discharge pipe 53.

An important constitutional requirement of the embodiment shown in FIG. 4 is that the return pipe 51 be disposed in the crystallization reactor 9. The return pipe 51 is connected to the overflow riser 5 of the hydrocyclone 2 and the circulating water inflow pipe 54, and also communicates with the crystallization reactor 9 at the base portion. Following the removal of MAP particles in the hydrocyclone 2, the sludge passes through the overflow riser 5 and is supplied in its entirety to the return pipe 51. The return pipe 51 maintains an identical water level to the water surface of the reactor 9 such that a part of the returned sludge is returned to the reactor 9, while the remainder is supplied to the circulating water tank 55 through the circulating water inflow pipe 54.

The inflow rate into the hydrocyclone is determined principally according to the size of the employed hydrocyclone. With a two-inch hydrocyclone, an inflow rate of approximately 4 m³/hr is available, and with a four-inch hydrocyclone, an inflow rate of approximately 20 m³/hr is available. When the actual inflow rate is larger or smaller than a predetermined flow rate, the treatment performance varies. In a conventional crystallization reactor, return pipe 51 is not provided, and it is therefore difficult to match the sum total of the raw water 1 supply rate, the under flow rate of the hydrocyclone (the flow rate of the micro-particle discharge pipe 53 at the base portion of the reactor), and the chemical 10 supply rate with the extraction rate from the extraction pipe 52. This leads to increases or decreases in the water surface of the reactor 9. Hence, conventionally a level meter or the like must be provided to control the water level. In the embodiment shown in FIG. 4, this problem can be solved by providing the return pipe 51 in the crystallization reactor 9. More specifically, when the return pipe 51 communicates with the reactor 9 such that the sludge discharged from the overflow riser 5 of the hydrocyclone 2 is returned to the reactor 9 via the return pipe 51, and when an amount of sludge corresponding to the raw water supply amount and chemical supply amount is caused to overflow by the return pipe 51 constantly, the water level of the reactor 9 can be maintained at a constant level. As a result, no level meter need be provided, continuous introduction into the cyclone can be performed, and the water level is stable, enabling stable treatment.

The sludge which overflows from the return pipe 51 is led to the circulating water tank 55 via the circulating water inflow pipe 54. A part of the sludge overflows and is extracted as the treated sludge 8, while the remainder is introduced into the hydrocyclone 2 through the hydrocyclone inflow pipe 6.

The MAP particles in the reactor 9 are extracted via the extraction pipe 52 at a predetermined flow rate, and introduced into the hydrocyclone 2 via the hydrocyclone inflow pipe 6. An important constitutional requirement here is that the extraction pipe 52 be connected to the hydrocyclone inflow pipe 6 such that the MAP particles are introduced into the cyclone after the particle concentration in the extraction pipe 52 is diluted by circulating water (sludge) from the circulating water tank 55. The concentration of the MAP particles introduced into the hydrocyclone is an important operational factor affecting the treatment performance of the hydrocyclone, and therefore to prevent reductions in the particle concentration of the treated water and blockages of the cyclone under (cyclone base portion), the concentration is preferably as low as possible.

When the raw water supply amount supplied to the crystallization reactor 9 is defined as Q1, the chemical supply amount supplied to the crystallization reactor 9 is defined as Q2, the return amount of MAP crystals separated in the hydrocyclone 2 and then returned to the crystallization reactor 9 is defined as Q3, and the extraction amount of MAP crystal particles extracted from the extraction pipe 52 of the crystallization reactor 9 is defined as Q4, a relationship of $$Q1+Q2+Q3<Q4$$

is preferably maintained. By maintaining this relationship, the flow direction of a return water amount Q5 passing through the return pipe 51 can be maintained in a direction heading toward the crystallization reactor 9, and the MAP particles in the crystallization reactor 9 can be prevented from flowing out through the circulating water effluent pipe.

When the pH, water temperature, or sludge concentration in the reactor varies, a pH meter 57, water temperature meter, sludge concentration meter, or the like is preferably provided, and in accordance with the measured value, a pH adjusting agent is preferably added, or a heating/cooling operation or sludge concentration adjustment operation is preferably performed.

The lower portion structure of the hydrocyclone 2 preferably takes an inverted conical form. The hydrocyclone inflow pipe 6, micro-particle discharge pipe 53, and overflow riser (sludge discharge pipe) 5 are connected to the hydrocyclone 2. In the hydrocyclone 2, sludge containing MAP particles is introduced through the hydrocyclone inflow pipe 6 by the pressure of a pump, and is then caused to swirl down the inverted cone-shaped wall surface of the hydrocyclone 2. The MAP-containing particles, which have a greater specific gravity than the sludge, are collected and concentrated on a lower wall surface side by means of centrifugal force. The concentrated micro-particles are returned to the reactor either continuously or intermittently via the micro-particle discharge pipe 53. Alternatively, the micro-particles may be recovered via the recovery pipe 56 appropriately.

The concentration of the particles in the hydrocyclone inflow pipe 6 is an important operational factor affecting the treatment performance of the hydrocyclone 2, and to prevent reductions in the particle concentration of the treated water and blockages of the cyclone under, the concentration is preferably as low as possible. The degree to which the particle concentration should be reduced varies according to the concentration performance of the cyclone, but a preferable concentration is approximately several tens of grams per liter.

As described above, sludge from which MAP particles have been removed flows out from the overflow riser 5. The overflow riser 5 is connected to the return pipe 51 of the crystallization reactor 9, and hence all of the sludge from which the MAP micro-particles have been removed is supplied to the return pipe 51.

In the hydrocyclone 2, the pipe diameter of the micro-particle discharge pipe and the pipe diameter of the sludge discharge pipe may be altered, and by altering both, the flow rate and particle diameter distribution can be varied.

The circulating water inflow pipe 54, which is connected to the return pipe 51 of the crystallization reactor 9, the hydrocyclone inflow pipe 6, and the treated water (sludge) 8 discharge pipe are connected to the circulating water tank 55. A part 8 of the sludge that flows into the circulating water tank 55 through the circulating water inflow pipe 54 overflows into the treated water discharge pipe. The circulating water tank 55 stores circulating water (having identical properties to the treated water) temporarily, and its size may be determined arbitrarily. Needless to say, a stirring apparatus may be provided to ensure that the circulating water is mixed evenly.

A screen residue removal apparatus may be provided in the extraction pipe 52, which is connected to the sludge 1 supply pipe and/or the base portion of the crystallization reactor 9. By removing screen residue, a dramatic improvement in the stability of MAP particle separation using the hydrocyclone 2 can be achieved. Moreover, by separating screen residue in advance, MAP with a high degree of purity can be obtained.

In the example shown in FIG. 5, the circulating water tank 55 is disposed directly above the return pipe 51. In so doing, the circulating water inflow pipe 54 of the embodiment in FIG. 4 can be omitted.

As shown in FIG. 6, the crystallization reactor 9 may be provided with a base portion having a columnar or other shape below the inverted conical part, and the extraction pipe 52 may be connected to this columnar part.

As shown in FIGS. 4 to 6, the particle recovery pipe 56 for recovering the MAP particles concentrated by the hydrocyclone 2 may be connected to the base portion of the hydrocyclone 2 or the micro-particle discharge pipe 53. Typically, the MAP particle concentration in the crystallization reactor 9 increases as the crystallization reaction progresses, and hence by extracting the MAP particles from the hydrocyclone 2 appropriately, the MAP particle concentration in the crystallization reactor 9 can be maintained at a constant concentration. The MAP particles concentrated by the hydrocyclone 2 are returned to the crystallization reactor 9 through the micro-particle discharge pipe 53, and hence by connecting the recovery pipe 56 to the micro-particle discharge pipe 53, a part of the concentrated MAP particles can be discharged to the outside through the recovery pipe 56. The concentrated MAP particles may be discharged by means of valve switching, for example. The valve may be switched in accordance with a fixed timer setting, or the particle concentration in the crystallization reactor 9 may be detected so that the valve is switched in accordance with the detection value.

The recovered MAP particles may be subjected to a process such as cleaning, dewatering, or drying in preparation for reuse.

Further, a cleaning pipe (not shown) for supplying cleaning water to clean the hydrocyclone may be connected to the micro-particle discharge pipe 53 or the recovery pipe 56. To ensure that the under (base portion) of the hydrocyclone 2 does not become blocked, measures such as removing large particles in advance and reducing the concentration of the particles that are introduced into the hydrocyclone 2 are usually taken. Even so, in certain cases blockages occur. In such cases, cleaning water may be supplied to flow in an upward flow from the cyclone under (base portion) so as to push the particles out to the cyclone main body side. When supplying cleaning water, the micro-particle discharge pipe and recovery pipe may be closed using a valve or the like.

A further embodiment of the present invention provides a treatment system in which a plurality of hydrocyclone are connected in series so that the crystallization reactor can be reduced in size, blockages of the hydrocyclone can be eliminated, and stable treatment maintaining a high MAP particle concentration in the crystallization reactor can be performed. An example of this embodiment is shown in FIGS. 7 to 10.

Figure 7:
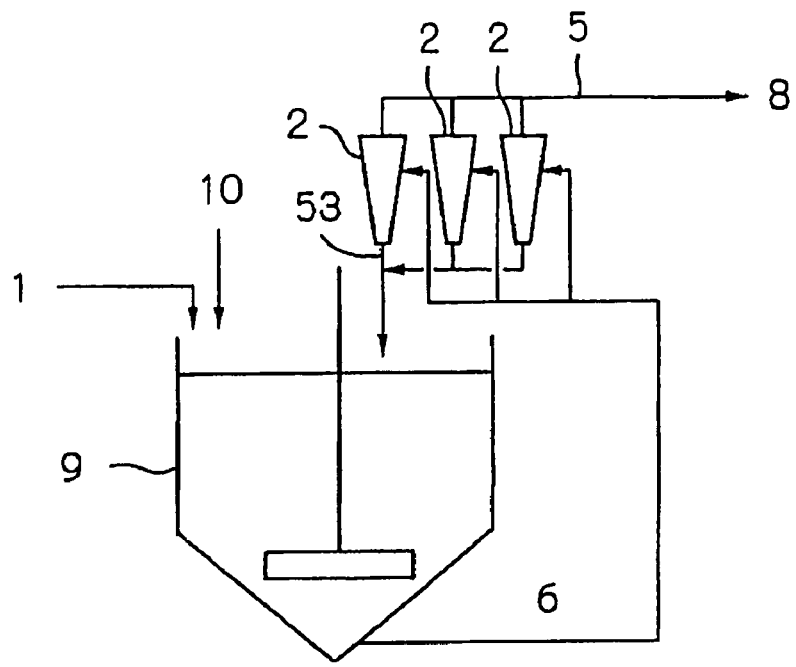
FIG. 7 is a treatment flow diagram pertaining to an embodiment of the present invention.

FIG. 7 shows a treatment flow in which the crystallization reactor 9 is used to crystallize phosphorus dissolved in the raw sludge 1, and the hydrocyclone 2 is used to concentrate the MAP contained in the sludge and to discharge the concentrated MAP through the micro-particle discharge pipe 53 such that the sludge 8 from which MAP has been removed overflows from the sludge discharge pipe (overflow riser).

Contaminants such as screen residue are preferably removed from the raw sludge 1 in advance by using a screen residue removal apparatus (also referred to as a contaminant removal apparatus). A centrifugal settler, a sedimentation tank employing gravity separation, and so on may be employed as the screen residue removal apparatus, while a vibrating screen, a bar screen, a drum screen, a filter layer, a classification layer-type separation tank, and so on, or an apparatus combining the principles thereof, may be employed as a micro-particle separation method using differences in particle diameter. By disposing the screen residue removal apparatus before the crystallization reactor 9 and/or the hydrocyclone 2, contaminants can be prevented from becoming caught in the stirring apparatus inside the crystallization reactor 9, and hence blockages of the hydrocyclone 2 can be prevented. As a result, treatment can be stabilized, and the frequency with which cleaning and maintenance must be performed can be reduced. Moreover, by separating screen residue in advance, MAP having a high degree of purity can be obtained. Note that the screen residue removal apparatus may be disposed in the hydrocyclone inflow pipe 6, which is connected to the base portion of the crystallization reactor 9.

The crystallization reactor 9 is connected to the raw sludge 1 supply pipe, the magnesium 10 supply pipe, the micro-particle discharge pipe 53 of the hydrocyclone 2, and the sludge discharge pipe (overflow riser) 5. In certain cases, a pH meter and pH adjusting agent supply pipe are also provided in the crystallization reactor 9. There are no particular limitations on the form of the reactor, and a complete mixing type reactor comprising a mechanical stirring apparatus, a jet stream type stirring reactor using a pump, a fluidized bed reactor charged with seed crystals at a high density, an internal circulation type reactor comprising a draft tube, an external circulation type reactor, or another reactor may be used.

When sludge is the treatment subject, a complete mixing type reactor comprising a mechanical stirring apparatus which is capable of applying a strong shearing force is preferably employed.

In the crystallization reactor 9, MAP is precipitated by adding the magnesium compound 10 to the sludge or the separated water 1 that is generated as a result of sludge concentration or dewatering treatment. If aeration, decompression, or a similar process is also performed at this time, the sludge is decarbonated, leading to an increase in the pH, and hence MAP can be precipitated more efficiently. Needless to say, a chemical such as sodium hydroxide, magnesium hydroxide, or magnesium oxide may be added to raise the pH. As the added magnesium compound, magnesium chloride, magnesium hydroxide, magnesium oxide, sea water, and so on may be used. As regards the amount of added magnesium, a molar ratio between 0.1 and 10, preferably between 0.5 and 3.0, and more preferably between 0.8 and 1.2 in relation to the aqueous orthophosphoric acid concentration of the digested sludge is suitable. The pH in the reaction should be between 7.0 and 11.0, and preferably between 7.5 and 8.5.

Seed crystals are preferably added to the crystallization reactor 9 to ensure that MAP is generated efficiently. The MAP that precipitates spontaneously in the digestion tank, the MAP that precipitates in the crystallization reactor 9, the MAP that is concentrated by the hydrocyclone 2, MAP precipitated in a separate crystallization reactor, and so on may be used as the seed crystals.

Alternatively, a powder or granular substance such as rock phosphate, dolomite, bone charcoal, activated carbon, silica sand, or calcium silicate may be used. The particle diameter of the seed crystals is arbitrary, but is preferably set between 0.05 and 3.0 mm, and more preferably between 0.1 and 0.5 mm. By precipitating new MAP on the surface of the seed crystals, separation of the digested sludge and MAP in a subsequent separation process can be performed favorably. The seed crystal charging amount is extremely important for precipitating MAP on the surface of the seed crystals.

Figure 11:
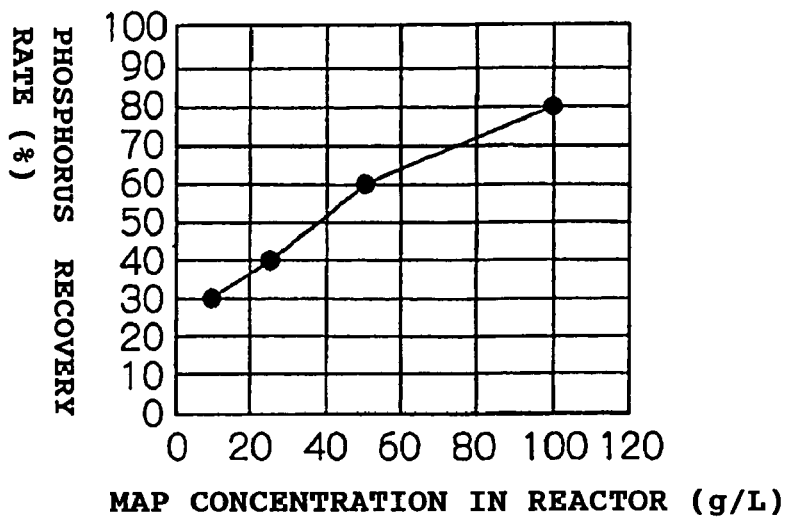
FIG. 11 is a graph showing the relationship between a MAP amount in a crystallization reactor and a phosphorus recovery rate.

FIG. 11 shows the relationship between the MAP amount in the crystallization reactor and the phosphorus recovery rate. As is evident from FIG. 11, the recovery rate rises as the MAP charging amount increases, and therefore by setting the MAP amount charged into the reactor to at least 10 g/L, at least 30% of the phosphorus can be recovered.

Further, the phosphorus introduction amount in relation to the seed crystal surface area (referred to as the phosphorus surface area load, hereafter) should be set to no more than 100 g-P/m$^2$/d, preferably no more than 30 g-P/m$^2$/d, and more preferably no more than 10 g-P/m$^2$/d.

The MAP concentration in the crystallization reactor is determined according to the raw sludge supply amount and the concentration of the MAP contained in the raw sludge, the amount and concentration of the MAP that is concentrated by the hydrocyclone and returned to the crystallization reactor, and the crystallization amount of the reactor. As noted above, it is important to increase the crystal surface area by raising the MAP concentration in the reactor, but since the MAP concentration of the raw sludge is approximately 1/10 to 1/500 that of the MAP which is concentrated by the hydrocyclone, the MAP concentrated by the hydrocyclone is diluted by the raw sludge. As a result, it becomes more and more difficult to maintain the MAP in the reactor at a high concentration as the raw sludge amount increases.

Hence, in the embodiment shown in FIGS. 7 to 10, a plurality of the hydrocyclones 2 are disposed in series such that each hydrocyclone is capable of independent control. Further, the MAP that is concentrated by each hydrocyclone 2 is returned partially or entirely to the crystallization reactor 9 by the micro-particle discharge pipe 53. By employing this constitution, the MAP concentration in the crystallization reactor 9 can be maintained at a desired concentration, and since a larger amount of the MAP concentrated by the hydrocyclones 2 is returned, the MAP concentration in the crystallization reactor 9 can be maintained at a high concentration. Consequently, this greatly contribute to reduce the size of the crystallization reactor 9.

The number of hydrocyclones 2 may be set at a desired number of two or more. The number of hydrocyclones 2 may be determined in consideration of the concentration flow rate of the hydrocyclones, the concentration of the concentrated MAP, and the desired MAP concentration in the crystallization reactor.

Further, in the embodiment shown in FIGS. 7 to 10, the MAP concentration in the reactor can be adjusted by connecting the recovery pipe 56 to the base portion of the hydrocyclones 2 or the micro-particle discharge pipe 53 and extracting a part of the MAP concentrated by the hydrocyclones, as shown above in FIG. 4 and so on. The concentrated MAP particles may be extracted intermittently or continuously from a specific cyclone, each cyclone in sequence, or all of the cyclones simultaneously. The extracted MAP may be put to effective use as a fertilizer, an inorganic chemical, a chemical raw material, and so on.

Note that a part of the sludge 8 that flow out from the overflow riser 5 of the hydrocyclones following recovery of the micro-particles may be returned to the hydrocyclone inflow pipe 6. In this case, the sludge 8 preferably passes through a relay tank.

Figure 8:
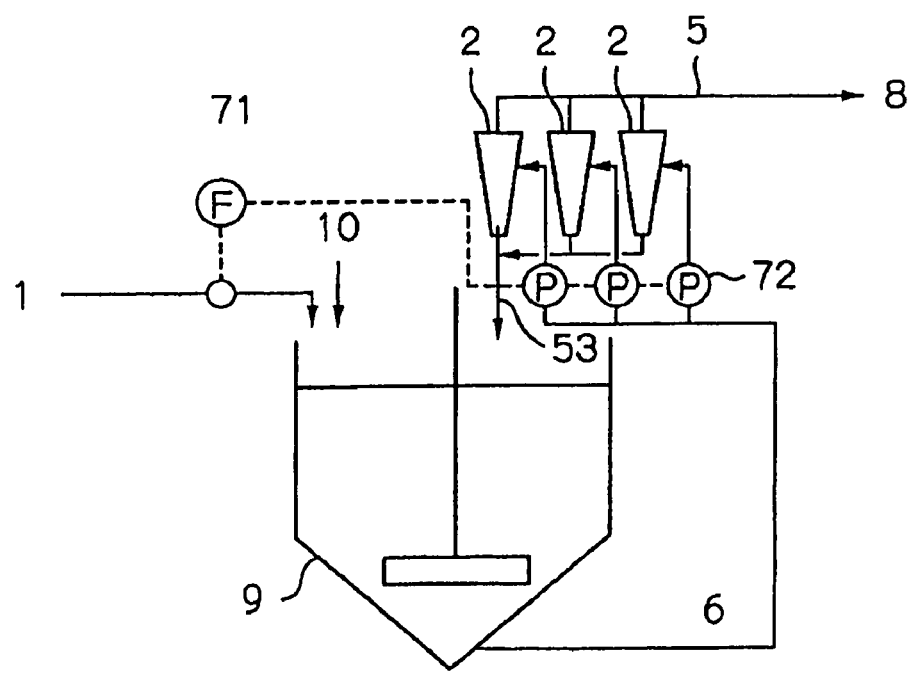
FIG. 8 is a treatment flow diagram pertaining to an embodiment of the present invention.

When a plurality of hydrocyclones are disposed in series, the number of operational hydrocyclones may be controlled in accordance with the raw water flow rate, for example as shown in FIG. 8. More specifically, a flow meter 71 is disposed on the raw sludge 1 supply pipe to monitor the inflow rate of raw sludge into the crystallization reactor 9. By determining a number of operational pumps disposed at the inflow portion of each hydrocyclone 2 from the relationship between a preset flow rate range and the number of operational hydrocyclones 2, the number of operational hydrocyclones 2 can be determined. In so doing, the interior of the crystallization reactor 9 can be maintained at a desired MAP concentration even when the raw sludge inflow rate varies.

Figure 9:
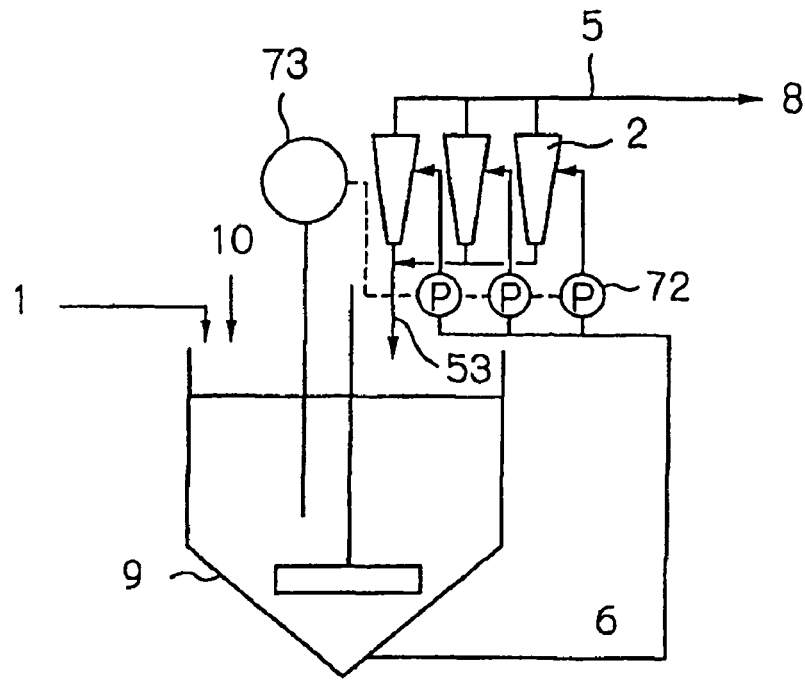
FIG. 9 is a treatment flow diagram pertaining to an embodiment of the present invention.

The number of operational hydrocyclones 2 can be also controlled in accordance with the MAP concentration in the crystallization reactor, as shown in FIG. 9. The MAP concentration in the crystallization reactor 9 can be measured using a concentration meter 73 employing a transmitted light/scattered light method, a laser light diffusion method, an ultrasonic method, a microwave method, a near infrared method, or another method. The MAP concentration may be measured together with the organic matter concentration, and since there is little variation in the organic matter concentration in the crystallization reactor 9, the MAP concentration may be calculated by creating a calibration curve.

Figure 10:
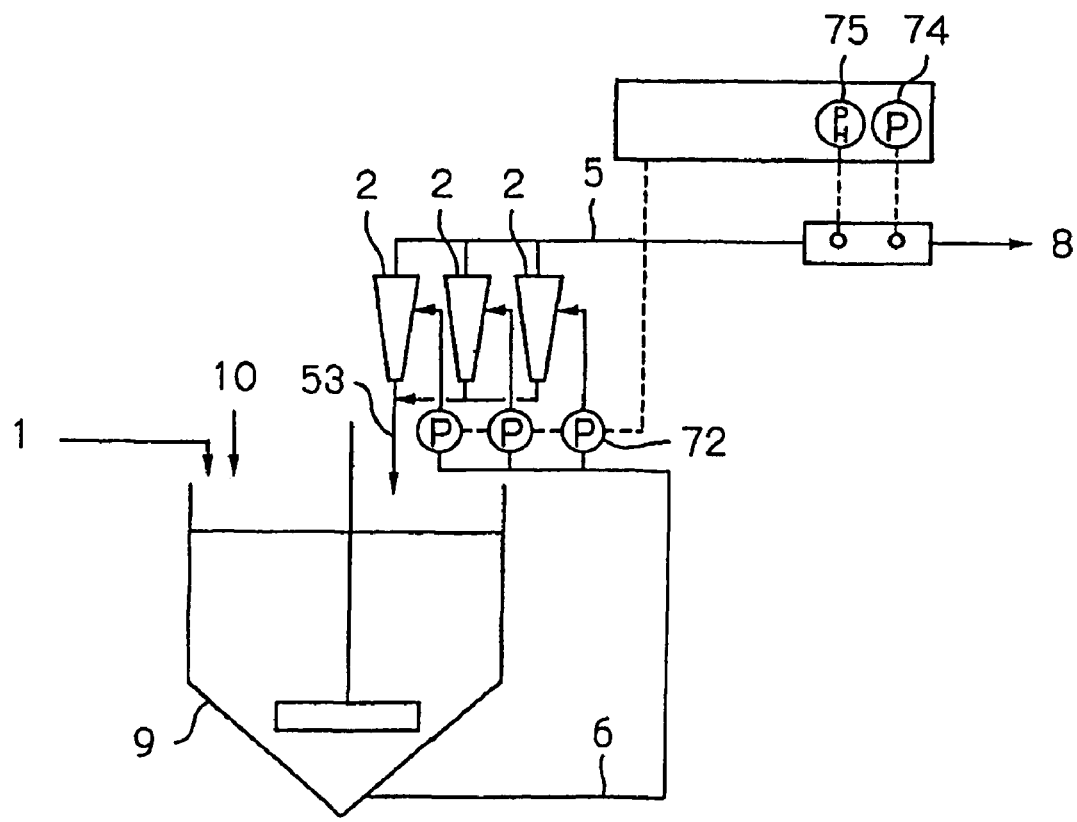
FIG. 10 is a treatment flow diagram pertaining to an embodiment of the present invention.

Further, as shown in FIG. 10, by monitoring the phosphorus concentration and pH of the sludge or separated water treated in the crystallization reactor and hydrocyclones, or in other words the sludge or separated water 8 that flows out from the overflow riser 5 of the hydrocyclones 2, using a phosphorus concentration meter 74 and a pH meter 75, the supersaturation ratio can be calculated on the basis of the resultant measurement data, and in accordance with the supersaturation ratio, the magnesium addition amount and the number of operational hydrocyclones can be controlled.

The pH and phosphorus concentration can be measured using an arbitrary analytical instrument, and monitoring may be performed continuously or at fixed time intervals. It is preferable that the total phosphorus, including the phosphorus dissolved in the sludge, and particles as well as the soluble phosphorus, be measured.

The supersaturation ratio is calculated by a calculation apparatus using the pH and phosphorus concentration obtained as a result of the monitoring. A personal computer or the like is a representative example of the calculation apparatus. An input apparatus, display apparatus, or other apparatus may be employed.

The supersaturation ratio will now be described.

The supersaturation ratio is calculated in the following manner.

$$\text{Supersaturation ratio} = [Mg^{2+}][NH_3^+][PO_4^{3-}]/SP \quad (1)$$

Here, SP denotes the solubility product of MAP, which is $10^{-12.6}$ (General Water Quality Chemistry; Kyoritsu Shuppan Ltd.). [$Mg^{2+}$] and [$NH_3^+$] denote the molarities of respective ions, which vary according to the pH, and hence the number of unknown quantities for calculating the supersaturation ratio is four. The supersaturation may be expressed in other ways such as $$\text{supersaturation} = ([Mg^{2+}][NH_3^+][PO_4^{3-}])^{(1/3)}/SP^{(1/3)} \quad (2)$$

or $$\text{supersaturation} = [Mg^{2+}][NH_3^+][PO_4^{3-}] - SP \quad (3).$$

In all cases, deviation in the solubility product is used as an index. Here, calculation is performed using the supersaturation ratio of Equation (1) as an index.

When the supersaturation ratio is 1 in Equation (1), this indicates that the sludge or liquid is in a state of equilibrium, and hence even if local crystallization and dissolution are occurring repetitively, as a whole crystallization is not underway. When the supersaturation ratio is greater than 1, this indicates a state of supersaturation, i.e. a region in which the concentration which exceeds the ionic product is crystallized such that MAP scale is generated. MAP scale is generated until a state of equilibrium is achieved, and the amount of MAP scale increases as the supersaturation ratio increases. When the supersaturation ratio is no more than 1, this indicates a state of unsaturation, i.e. a region in which MAP scale is not generated.

The ammonium ion concentration in the anaerobically digested sludge of the sewerage sludge also varies according to regionality and treatment method, but is set at a fixed value between approximately 500 and 3000 mg/L.

The magnesium concentration and phosphorus concentration are preferably measured in a similar manner, and since magnesium is added as a chemical such that Mg/P=1.0, the concentration of the remaining Mg can be estimated between 10 and 100 mg/L.

MAP scale is less likely to occur as the supersaturation ratio, calculated in the manner described above, decreases, and therefore a supersaturation ratio of no greater than 30, preferably no greater than 10, and more preferably no greater than 5 is desirable.

By means of the supersaturation ratio calculated in this manner, the number of operational hydrocyclones can be controlled. As noted above, when the MAP concentration in the crystallization reactor decreases, the MAP recovery rate falls, and hence the supersaturation ratio of the treated sludge 8 increases. In this case, when the number of operational hydrocyclones is increased such that the MAP concentration in the crystallization reactor rises, the phosphorus concentration of the treated sludge decreases, leading to a reduction in the supersaturation ratio, and hence scale generation can be suppressed to a minimum.

The amount of magnesium to be added to the crystallization reactor can also be controlled by calculating the supersaturation ratio. More specifically, in a case where the supersaturation ratio is calculated by measuring the soluble phosphorus concentration, the phosphorus concentration is high when the supersaturation ratio is high, and hence the phosphorus concentration can be reduced by increasing the magnesium addition amount.

Although not shown in FIGS. 7 to 10, the treated sludge from which MAP particles have been removed, which flows out from the overflow riser 5 of the hydrocyclones 2, may be returned to the inflow pipe 6 of the hydrocyclones 2, as described above in the flow of FIGS. 2 to 6. Also, the particle slurry concentrated by the hydrocyclone 2 may be extracted and recovered appropriately.

Providing a plurality of hydrocyclones and controlling operations thereof may be adopted likewise in a flow having the constitution shown in FIGS. 2 to 6, or flows having the constitutions shown in FIGS. 12 to 17 and FIG. 18 to be described below, for example.

According to a still further aspect of the present invention, there is provided a treatment process for treating digested sludge generated by subjecting organic waste matter to anaerobic digestion, comprising steps for: decarbonating the digested sludge or crystallizing MAP from the digested sludge; removing screen residue from the digested sludge; and separating or concentrating crystals containing MAP from the digested sludge after the digested sludge passes through the steps for decarbonating or crystallizing and removing the screen sludge. Also, the present invention includes the following aspects.

According to a further aspect of the present invention, there is provided a digested sludge treatment apparatus for treating digested sludge generated by subjecting organic waste matter to anaerobic digestion, comprising: an apparatus for decarbonating the digested sludge; a removal apparatus for removing screen residue from the digested sludge; and an apparatus for separating or concentrating crystals containing magnesium ammonium phosphate from the digested sludge after the digested sludge passes through the decarbonation apparatus and the removal apparatus.

According to a further aspect of the present invention, there is provided a digested sludge treatment apparatus for treating digested sludge generated by subjecting organic waste matter to anaerobic digestion, comprising: a crystallization reactor for precipitating magnesium ammonium phosphate from the digested sludge; a removal apparatus for removing screen residue from the digested sludge; and an apparatus for separating or concentrating crystals containing magnesium ammonium phosphate from the digested sludge after the digested sludge passes through the crystallization reactor and screen residue removal apparatus.

According to a further aspect of the present invention, there is provided the digested sludge treatment apparatus as defined hereinbefore, wherein said screen residue removal apparatus is a wet-type vibrating screen equipped with two or more types of sieve bodies having different hole diameters.

According to a further aspect of the present invention, there is provided the digested sludge treatment apparatus as defined hereinbefore, further comprising a cleaning apparatus for cleaning said separated crystals containing magnesium ammonium phosphate.

According to a further aspect of the present invention, there is provided a method of preventing scale from forming on the inside of a pipe when digested sludge generated by subjecting organic waste matter to anaerobic digestion is transported via the pipe, wherein the digested sludge is treated in a decarbonation process and a screen residue removal process, microparticles containing MAP are separated from the digested sludge following decarbonation and screen residue removal, and following removal of these micro-particles, the digested sludge is transported via the pipe.

In this method of the present invention, following micro-particle removal, the digested sludge is preferably subjected to processing to lower the pH and/or processing to reduce at least one of the magnesium ion concentration, phosphate ion concentration, and ammonium ion concentration, and then transported via the pipe. The anaerobic digestion may be performed following a discharge process for discharging phosphate ions from the organic waste matter and a concentration process for concentrating the organic waste matter following the discharge process. Further, the digested sludge that is transported via the pipe may have a magnesium ion concentration of no more than 20 mg/L, and preferably no more than 5 mg/L.

A further aspect of the present invention provides an apparatus for preventing scale from forming on the inside of a pipe when digested sludge generated by treating organic waste matter in an anaerobic digestion tank is transported via the pipe, comprising: an apparatus for decarbonating the digested sludge; a removal apparatus for removing screen residue from the digested sludge; and an apparatus for separating micro-particles containing MAP from the digested sludge after the digested sludge passes through the decarbonation apparatus and screen residue removal apparatus.

This apparatus of the present invention preferably further comprises a chemical adding apparatus for lowering the pH of the digested sludge following micro-particle removal, and/or a chemical adding apparatus for reducing at least one of the magnesium ion concentration, phosphate ion concentration, and ammonium ion concentration thereof. Further, discharging means for discharging phosphate ions from the organic waste matter and a concentration apparatus for concentrating the organic waste matter following the discharge process may be disposed before the anaerobic digestion tank.

A further aspect of the present invention provides a digested sludge treatment method for treating digested sludge generated by subjecting organic waste matter to anaerobic digestion, wherein the digested sludge is treated in a crystallization process for precipitating MAP by adding a magnesium compound and screen residue removal process for removing screen residue such as night soil residue from the digested sludge, micro-particles containing MAP are recovered from the digested sludge in a separation process following the crystallization process and screen residue removal process, and following removal of these micro-particles, the digested sludge is dewatered in a dewatering process. In this method of the present invention, the MAP-containing micro-particles recovered in the separation process, or a portion or all of MAP-containing effluent generated in the separation process, may be returned to the crystallization process, and a portion or all of the screen residue removed in the screen residue removal process may be supplied to the dewatering process. Further, following micro-particle removal, the digested sludge is preferably subjected to processing to lower the pH and/or processing to reduce at least one of the magnesium ion concentration, phosphate ion concentration, and ammonium ion concentration, and then transported to the dewatering process.

A further aspect of the present invention provides a digested sludge treatment apparatus for treating digested sludge generated by subjecting organic waste matter to anaerobic digestion, comprising: a crystallization apparatus having adding means for adding a magnesium compound in order to precipitate MAP during treatment of the digested sludge; a screen residue removal apparatus for removing screen residue from the digested sludge; a separation apparatus for recovering micro-particles containing MAP from the digested sludge after the digested sludge passes through the crystallization apparatus and screen residue removal apparatus; and a dewatering apparatus for dewatering the digested sludge following removal of the micro-particles. In this apparatus of the present invention, a return path may be provided for returning a portion or all of the MAP-containing micro-particles recovered by the separation apparatus to the crystallization apparatus, and supply means may be provided for supplying a portion or all of the screen residue removed by the screen residue removal apparatus to the dewatering apparatus. Further, a chemical adding apparatus for lowering the pH of the digested sludge following micro-particle removal, and/or a chemical adding apparatus for reducing at least one of the magnesium ion concentration, phosphate ion concentration, and ammonium ion concentration thereof, may be provided after the separation apparatus.

According to the present invention, by employing the constitution described above, MAP scale on the inside of a pipe for transporting digested sludge can be reduced greatly, and/or phosphorus can be recovered efficiently from the inside of a digestion tank.

DETAILED DESCRIPTION OF THE INVENTION

Embodiments of the present invention will be illustrated hereinafter with reference to FIGS. 12 to 17. In FIGS. 12 to 17 and FIGS. 33 to 35 that will be mentioned hereinafter, each of reference numerals in the drawings denotes the following meaning.

Figure 12:
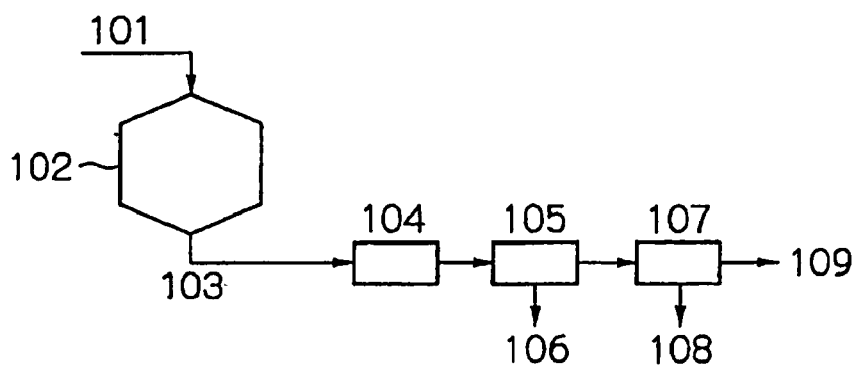
FIG. 12 is a treatment flow diagram pertaining to an embodiment of the present invention.

101: introduced sludge
102: anaerobic digestion tank
103: digested sludge (extracted sludge)
104: decarbonation process
105: screen residue removal process
106: screen residue
107: process for separating micro-particles containing MAP
108: recovery of micro-particles containing MAP
109: out of the system
110: pH adjustor
111: concentrated excess sludge
112: phosphorus discharge tank
113: BOD source
114: concentration process
115: separated water
116: dewatering process
117: concentration-adjusted water
118: sludge liquor
201: introduced sludge
202: anaerobic digestion tank
203: extracted sludge (digested sludge)
204: crystallization process
205: Mg compound
206: screen residue removal process
207: screen residue
208: process for separating micro-particles containing MAP
209: recovery of micro-particles containing MAP
210: dewatering process
211: sludge liquor
212: out of the system
213: micro-particle transportation pipe
214: screen residue transportation pipe FIG. 12 is a flow diagram showing an example of a treatment flow according to the present invention, which is constituted by an anaerobic digestion tank 102, a decarbonation process 104 for decarbonating digested sludge, a screen residue separation process 105, and a micro-particle separation process 107 for separating and recovering micro-particles containing MAP.

Excess sludge and/or primary sludge are introduced into the anaerobic digestion tank 102. The interior of the anaerobic digestion tank is heated and maintained at a temperature of approximately 55° C. or approximately 35° C. In the anaerobic digestion tank, the sludge is broken down into a gas such as methane, carbon dioxide, hydrogen sulfide; water-soluble nitrogen and phosphorus, and so on by the action of acid-fermentative bacteria and methanogenic bacteria. The generated methane gas may be recovered and used as energy. The amount of generated methane gas is increased by introducing easily-decomposable raw sludge in addition to excess sludge. As the sludge decomposes, phosphorus, magnesium, and ammonium are dissolved into the liquid side, and thus MAP is generated spontaneously in the anaerobic digestion tank.

As a result of this MAP precipitation, scale trouble occurs on the draft tube, the base portion of the anaerobic digestion tank, the sludge discharge pipe, and so on.

The ratio of the phosphorus, magnesium, and ammonium in the digested sludge is generally phosphorus magnesium: ammonium=100 to 500: several to several tens:1000, and hence the magnesium concentration is overwhelmingly lower than the phosphorus and ammonium concentrations. During MAP generation in the digestion tank, the magnesium concentration clearly serves as a rate control.

The digested sludge contains micro-particles containing MAP, and has a pH in the vicinity of 7, a phosphorus concentration between 100 and 500 mg/L, a magnesium concentration between several and several tens of mg/L, and an ammonium concentration between 500 and 4000 mg/L. Conventionally, a large amount of MAP scale is generated in a sewer when digested sludge having these properties is transported via pipe, leading to problems such as blockages.

As a result of committed research into the phenomenon of scale generation, performed by the present inventors and others, it was ascertained that pH variation and gas phase intermixing inside the pipe leads to decarbonation, causing the generation of MAP and hence scaling. In other words, the digested sludge continues to possess a latent ability to generate MAP (referred to as MAP generation ability, hereinafter). To make matters worse, the MAP micro-particles generated spontaneously in the digested sludge act as seed crystals, promoting scale generation.

The present inventors focused on the remnant MAP generation ability described above, and thus discovered a need to reduce the remnant MAP generation ability before the digested sludge is introduced into a sewer. The present inventors discovered that the MAP generation ability of digested sludge is greatly reduced by decarbonating the digested sludge to raise the pH such that MAP is generated in advance, and then separating the MAP contained in the digested sludge and the MAP generated in the decarbonation process from the digested sludge, as in the present invention.

Aeration treatment or decompression treatment may be employed in the decarbonation process 104. Aeration treatment involves aerating the digested sludge such that the carbon gas in the sludge is dispersed into the gas phase, thereby raising the pH such that MAP is generated in a quantity corresponding to the amount of remaining magnesium. In decompression treatment, a degassing apparatus such as that disclosed in Japanese Unexamined Patent Application Publication H7-136406 (referred to as a thin film vacuum degassing apparatus hereafter) is preferably used. Specifically, a subject liquid is put in acceleration by the centrifugal force of a sifting body which has a base and is rotated in a vacuum container, whereby the subject liquid collides with the inner wall surface of the vacuum container such that the gas in the subject liquid is removed. As a result of the decompression treatment, decarbonation occurs, leading to an increase in the pH and the generation of MAP.

In the treatment described above, if the magnesium ion concentration of the liquid decreases, the MAP generation ability disappears, and hence scale generation is suppressed. For example, if the pH is raised from 7 to 8, the magnesium ion concentration of the digested sludge generally falls to $1/10$ to $1/2$. In the present invention, the magnesium ion concentration of the digested sludge is set at no more than 20 mg/L, and preferably no more than 5 mg/L. When the magnesium ion concentration is no more than 20 mg/L, almost no MAP supersaturation occurs even when the pH in the sewer varies, or when the gas phase is intermixed such that the pH rises, for example, and hence MAP precipitation can be prevented.

In addition to a decarbonation method by aeration and decompression, a decarbonation by chemical addition may be employed. Needless to say, these operations may be combined and performed in any order. The decarbonated digested sludge is then introduced into the screen residue removal process 105. Conventionally, no screen residue separation process is performed, and therefore when a hydrocyclone is used in the subsequent micro-particle separation process 107, blockages caused by screen residue and the like occur. For this reason, there is demand for a treatment method exhibiting long-term stability. In the present invention, screen residue are removed, enabling a vast improvement in the stability of the subsequent micro-particle separation process 107, particularly when this process employs a hydrocyclone.

The removed screen residue 106 may be discharged outside of the system or mixed into the digested sludge following the micro-particle separation process 107. When a dewatering process is provided, the screen residue 106 may be introduced in the dewatering process. In this case, the dewatering performance is enhanced, and it is therefore preferable to introduce the screen residue 106 into the dewatering process if such a process is provided.

Note that the decarbonation process 104 and screen residue removal process 105 may be performed in any order. The decarbonation process 104 may precede the screen residue removal process 105, or the screen residue removal process 105 may precede the decarbonation process 104, as shown in FIG. 12 and so on.

Following the decarbonation process 104 and screen residue removal process 105, the micro-particles containing MAP precipitated in the digestion tank and during the decarbonation process are separated from the digested sludge. A hydrocyclone, a centrifugal settler, a sedimentation tank employing gravity separation, and so on may be employed as a method of separating the micro-particles from the digested sludge using the specific gravity difference between the two, while a vibrating screen, a drum screen, a filter layer, a classification layer-type separation tank, and so on may be employed as a micro-particle separation method using differences in particle diameter.

A hydrocyclone has a reverse conical-form lower portion structure, and is constituted by a hydrocyclone inflow pipe, a micro-particle discharge pipe, and a sludge discharge pipe. In the hydrocyclone, the digested sludge containing MAP is caused to swirl down the wall surface of the reverse conical form by the pressure of an extractor pump. The MAP-containing micro-particles, which have a greater specific gravity than the digested sludge, are collected and concentrated on a lower wall surface side by means of centrifugal force. The concentrated micro-particles are extracted either continuously or intermittently.

In the present invention, screen residue are separated before the MAP-containing micro-particle separation process 107, and therefore problems such as blockages of the hydrocyclone caused by screen residue and the like are solved. Having passed through the decarbonation process 104, screen residue separation process 105, and micro-particle separation process 107, the digested sludge is transported through a sewer to a collective sludge treatment facility, other type of sludge treatment facility, or a sludge treatment facility within the same premises. As a result of the processes described above, the magnesium ion concentration of the digested sludge is greatly reduced and MAP micro-particles are removed from the digested sludge. Hence, according to the present invention, the MAP generation ability is reduced even upon pH variation or gas phase intermixing, and therefore MAP scale generation is reduced greatly.

Figure 13:
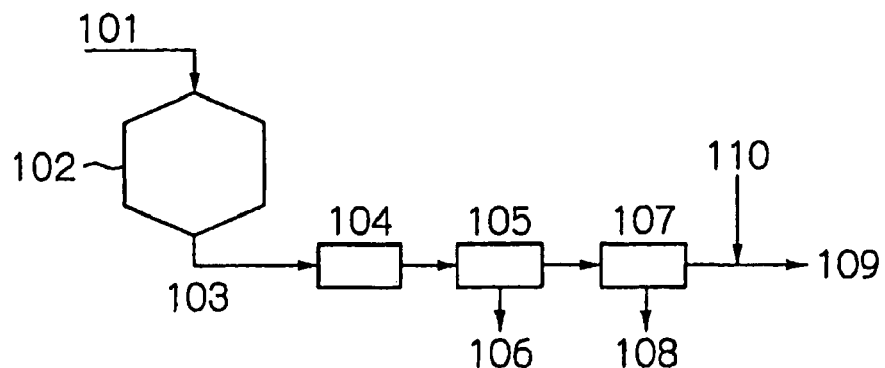
FIG. 13 is a treatment flow diagram pertaining to an embodiment of the present invention.

In the example shown in FIG. 13, processing to lower the pH and/or processing to reduce at least one of the magnesium ion concentration, phosphate ion concentration, and ammonium ion concentration are performed following the micro-particle separation process 107. A pH adjustor may be added as a method of reducing the pH. A chemical for lowering the pH of digested sludge, such as hydrochloric acid, sulfuric acid, aluminum salt, or iron salt, is used as the pH adjustor. With aluminum salt and iron salt, the soluble phosphorus contained in the digested sludge is fixed, causing a reduction in the solubility concentration. Ammonia stripping, fixation by adhesive, and so on may be used as a method of reducing ammonium ions. MAP is precipitated when any of the phosphorus concentration, magnesium concentration, ammonium concentration, and pH rises. Conversely, as described above, when the pH of the digested sludge falls or at least one of the magnesium ion concentration, phosphate ion concentration, and ammonium ion concentration is reduced, the MAP generation ability deteriorates. According to the present invention, the MAP generation ability deteriorates, reducing the likelihood of MAP scale generation. Note that with the addition of iron salt, the generation of hydrogen sulfide and the like from the digested sludge can be suppressed.

Figure 14:
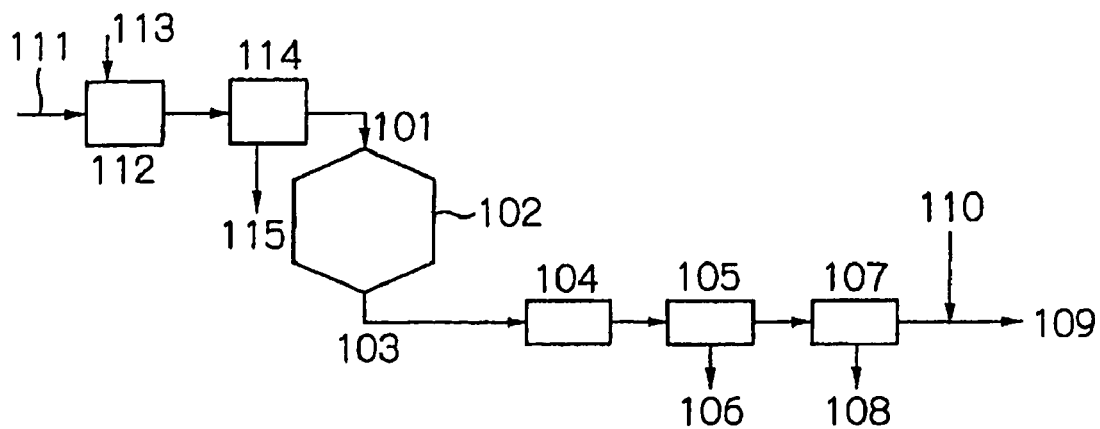
FIG. 14 is a treatment flow diagram pertaining to an embodiment of the present invention.

In the example shown in FIG. 14, excess sludge or concentrated excess sludge 111 is introduced into a phosphorus discharge tank 112. Phosphorus is discharged from the sludge by adding a BOD under anaerobic conditions. As a BOD source 113, organic waste matter containing raw sludge, a portion of the solubilized sludge that is generated when sludge solubilization treatment is performed, or a portion of the organic waste water from which the excess sludge is generated is used. Also, a chemical such as methanol may be added as a BOD source. In the phosphorus discharge tank 112, phosphorus is discharged from the excess sludge and concentrated excess sludge, and a part of the magnesium contained in the sludge is also eluted to the liquid side. Particularly when a biological dephosphorylation method such as an anaerobic/aerobic process is performed in a water treatment system, the phosphorus concentration and magnesium concentration of the liquid increase dramatically. When phosphorus is discharged from concentrated excess sludge, the phosphorus concentration and magnesium concentration of the liquid fall to approximately 50 to 400 mg/L and 50 to 200 mg/L, respectively. Meanwhile, ammonium elution is small, leading to an ammonium concentration of approximately 50 to 150 mg/L. Having undergone this phosphorus discharge treatment, the discharged sludge is separated into concentrated sludge 101 and concentrated sludge liquor 115 in a sludge concentration apparatus 114, or separated into sludge cake and sludge liquor in a dewatering apparatus. The sludge concentration apparatus 114 employs a method such as flotation separation, gravity separation, or mechanical separation. The dewatering apparatus employs a dewatering method such as centrifugal dewatering, belt pressing, or screw pressing.

The separated liquid and sludge liquor 115 contain concentrated phosphorus, and it is of course desirable that the phosphorus be removed and recovered by precipitating a phosphorus compound from this waste water. In the anaerobic digestion tank 102, the sludge is broken down such that the phosphorus, magnesium, and ammonium migrate to the liquid side, but by discharging the phosphorus and magnesium from the sludge in advance, before introduction into the anaerobic digestion tank, such that the phosphorus and magnesium concentrations decrease, as in the present invention, the amount of MAP that is generated spontaneously in the anaerobic digestion tank can be reduced. As a result, scale trouble caused by MAP and the like can be suppressed. Moreover, the amount of MAP that is discharged together with the digested sludge can be reduced. In FIG. 14, the digested sludge is decarbonated, screen residue are removed, and then the MAP-containing micro-particles are separated. The effects of these processes are as described above.

Figure 15:
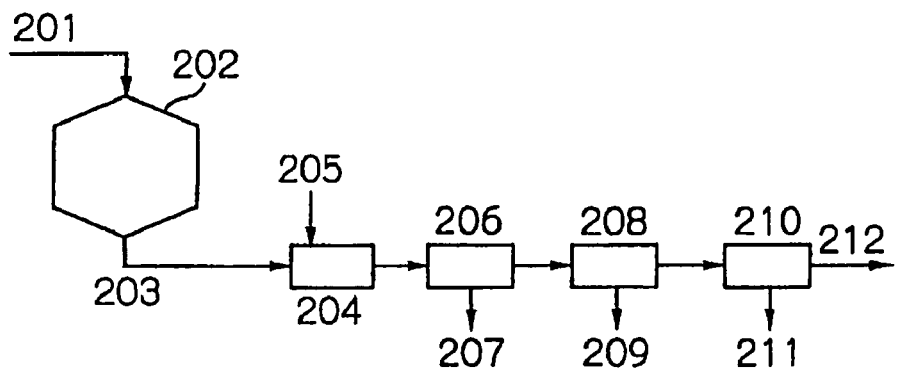
FIG. 15 is a treatment flow diagram pertaining to an embodiment of the present invention.

Another example of the treatment flow according to the present invention is illustrated in FIG. 15. The flow in FIG. 15 is constituted by an anaerobic digestion tank 202, a crystallization process 204, a screen residue removal process 206, a micro-particle separation process 208, and a dewatering process 210. Note that in the flow illustrated in FIG. 15 and the following FIGS. 16 and 17, the dewatering process 210 is not essential, and may be omitted.

Excess sludge and/or primary sludge 201 are introduced into the anaerobic digestion tank 202. The interior of the anaerobic digestion tank is heated and maintained at a temperature of approximately 55° C. or approximately 35° C. In the anaerobic digestion tank, the sludge is broken down into methane, carbon dioxide, a gas such as hydrogen sulfide, water-soluble nitrogen, phosphorus, and so on by the action of acid-fermentative bacteria and methanogenic bacteria. The generated methane gas may be recovered and used as energy. The amount of generated methane is increased by introducing easily-decomposable raw sludge in addition to the excess sludge. As the sludge decomposes, phosphorus, magnesium, and ammonium migrate to the liquid side. When the respective ion concentrations thereof reach or exceed the MAP solubility product, MAP is generated spontaneously in the anaerobic digestion tank. As a result of this MAP precipitation, scale trouble occurs on the draft tube, the base portion of the anaerobic digestion tank, the sludge discharge pipe, and so on.

Normally, the ratio of the phosphorus, magnesium, and ammonium in the digested sludge is generally phosphorus:magnesium:ammonium=100 to 500: several to several tens: 1000. The magnesium concentration is overwhelmingly lower than the phosphorus and ammonium concentrations, and therefore during MAP generation in the digestion tank, the magnesium concentration clearly serves as a rate control.

In the following crystallization process 204, MAP is precipitated by adding a magnesium compound to the digested sludge and digested sludge liquor extracted from the anaerobic digestion tank 202. If aeration, decompression, or the like is also performed at this time, the sludge is decarbonated, leading to an increase in the pH, and hence MAP can be precipitated more efficiently. Needless to say, a chemical such as sodium hydroxide, magnesium hydroxide, or magnesium oxide may be added to raise the pH. As the added magnesium compound, magnesium chloride, magnesium hydroxide, magnesium oxide, sea water, and so on may be used. As regards the amount of added magnesium, a molar ratio between 0.1 and 10, preferably between 0.5 and 3.0, and more preferably between 0.8 and 1.2 in relation to the aqueous orthophosphoric acid concentration of the digested sludge is suitable. The pH in the reaction should be between 7.0 and 11.0, and preferably between 7.5 and 8.5.

Seed crystals are preferably added to the crystallization process 204 to ensure that MAP is generated efficiently. The MAP that precipitates spontaneously in the digestion tank, the MAP that precipitates in the crystallization process 204, or MAP precipitated in a separate reactor may be used as the seed crystals.

As shown in another flow diagram of the present invention in FIG. 15, MAP-containing micro-particles and so on recovered in the separation process 208 may be supplied to the crystallization process 204 through a pipe 213 and be used as seed crystals. Separated water generated midway through the separation process or MAP contained in effluent or the like may also be used.

Alternatively, a powder or granular substance such as rock phosphate, dolomite, bone charcoal, activated carbon, silica sand, or calcium silicate may be used as seed crystals. The particle diameter of the seed crystals is arbitrary, but is preferably set between 0.05 and 3.0 mm, and more preferably between 0.1 and 0.5 mm. By precipitating new MAP on the surface of the seed crystals, separation of the digested sludge and MAP in the subsequent separation process can be performed favorably. The seed crystal charging amount is extremely important for precipitating MAP on the surface of the seed crystals. The charging amount is determined in consideration of the introduced phosphorus amount and the seed crystal particle diameter such that the phosphorus introduction amount in relation to the seed crystal surface area (the phosphorus surface area load hereafter) is no more than 100 g-P/m$^2$/d, preferably no more than 30 g-P/m$^2$/d, and more preferably no more than 10 g-P/m$^2$/d.

Next, the digested sludge is introduced into the screen residue removal process 206. Conventionally, no screen residue separation process is performed, and therefore when a hydrocyclone is used in the subsequent micro-particle separation process, blockages caused by screen residue and so on occur. For this reason, there is demand for a treatment method exhibiting long-term stability. In the present invention, screen residue is removed, enabling a vast improvement in the stability of the subsequent micro-particle separation process 208, particularly when this process employs a hydrocyclone. Furthermore, when a sedimentation tank is used, the screen residue, digested sludge, and MAP are mixed together, and hence in the past it has been impossible to obtain MAP having a high degree of purity. In the present invention, MAP with a high degree of purity can be obtained by separating the screen residue in advance. The separated screen residue may be discharged outside of the system or may be introduced into the dewatering process 210 through a pipe 214, as shown in another flow diagram of the present invention in FIG. 17. In this case, the dewatering performance is enhanced, and hence the screen residue 106 are preferably introduced into the dewatering process.

Figure 16:
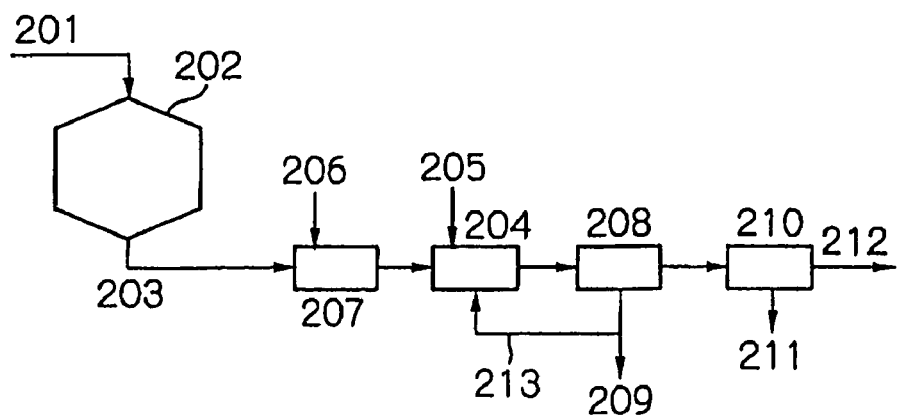
FIG. 16 is a treatment flow diagram pertaining to an embodiment of the present invention.
Figure 17:
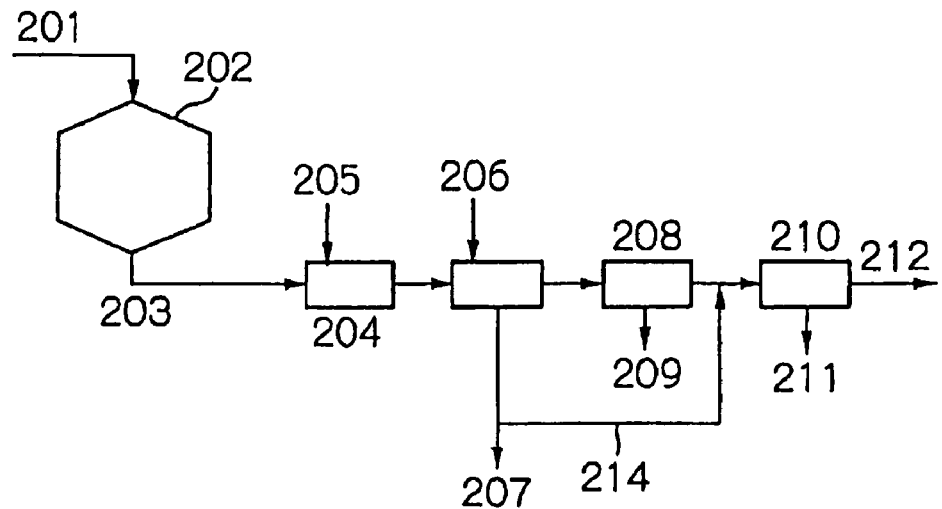
FIG. 17 is a treatment flow diagram pertaining to an embodiment of the present invention.

The crystallization process 204 and screen residue separation process 206 may be performed in any order. The crystallization process 204 may precede the screen residue separation process 206, as shown in FIG. 15, or the screen residue separation process 206 may precede the crystallization process 204, as shown in FIG. 16.

Following the crystallization process 204 and screen residue removal process 206, the micro-particles containing MAP precipitated in the digestion tank and during the crystallization process are separated from the digested sludge. A hydrocyclone, a centrifugal settler, a sedimentation tank employing gravity separation, and so on may be employed as a method of separating the micro-particles from the digested sludge using the specific gravity difference between the two, while a vibrating screen, a drum screen, a filter layer, a classification layer-type separation layer, and so on may be employed as a micro-particle separation method using differences in particle diameter. The digested sludge is viscous, making it difficult to separate the MAP from the digested sludge through natural sedimentation, and therefore a mechanical separation method using a hydrocyclone or the like is preferable. A hydrocyclone has a reverse conical-form lower portion structure, and it is constituted by a hydrocyclone inflow pipe, a micro-particle discharge pipe, and a sludge discharge pipe. In the hydrocyclone, the digested sludge containing MAP is caused to swirl down the wall surface of the reverse conical form by the pressure of an extractor pump. The MAP-containing micro-particles, which have a greater specific gravity than the digested sludge, are collected and concentrated on a lower wall surface side by means of centrifugal force. The concentrated micro-particles are extracted either continuously or intermittently.

In the present invention, screen residue such as night soil residue are separated before the MAP-containing micro-particle separation process 208, and therefore problems such as blockages of the hydrocyclone caused by screen residue and the like are solved.

In the dewatering process 210, the digested sludge separated from the MAP-containing micro-particles is dewatered. Belt pressing, screw pressing, filter pressing, centrifugal dewatering, and so on may be used as a dewatering method. As noted above, by introducing the screen residue separated in the screen residue separation process 206 into the dewatering process 210, the dewatering effect can be improved, and hence this is preferable.

To prevent pipe blockages caused by MAP scale following this process, processing to lower the pH and/or processing to reduce at least one of the magnesium ion concentration, phosphate ion concentration, and ammonium ion concentration are preferably performed following the micro-particle separation process 208. A pH adjustor may be added as a method of reducing the pH. A chemical for lowering the pH of digested sludge, such as hydrochloric acid, sulfuric acid, aluminum salt, or iron salt, is used as the pH adjustor. With aluminum salt and iron salt, the soluble phosphorus contained in the digested sludge is fixed, causing a reduction in the solubility concentration.

Ammonia stripping, fixation by adhesive, and so on may be used as a method of reducing ammonium ions. MAP is precipitated when any of the phosphorus concentration, magnesium concentration, ammonium concentration, and pH rises. Conversely, as described above, when the pH of the digested sludge falls or at least one of the magnesium ion concentration, phosphate ion concentration, and ammonium ion concentration is reduced, the MAP generation ability deteriorates. According to the present invention, the MAP generation ability deteriorates, reducing the likelihood of MAP scale generation. Note that with the addition of iron salt, the generation of hydrogen sulfide and the like from the digested sludge can be suppressed. Needless to say, each of the above processes may be performed in the same treatment facility, or the sludge may be piped to a different treatment facility for each process.

By means of the above processes, phosphorus can be recovered efficiently from the digested sludge. In the past, it has been particularly difficult to recover MAP generated spontaneously in a digestion tank, but with the present system, MAP can be recovered easily.

The crystallization reactor and hydrocyclone of the various embodiments illustrated above in FIGS. 1 to 10 may be employed as the apparatuses used in a crystallization process and a micro-particle separation process of the flows shown in FIGS. 12 to 17.

Figure 18:
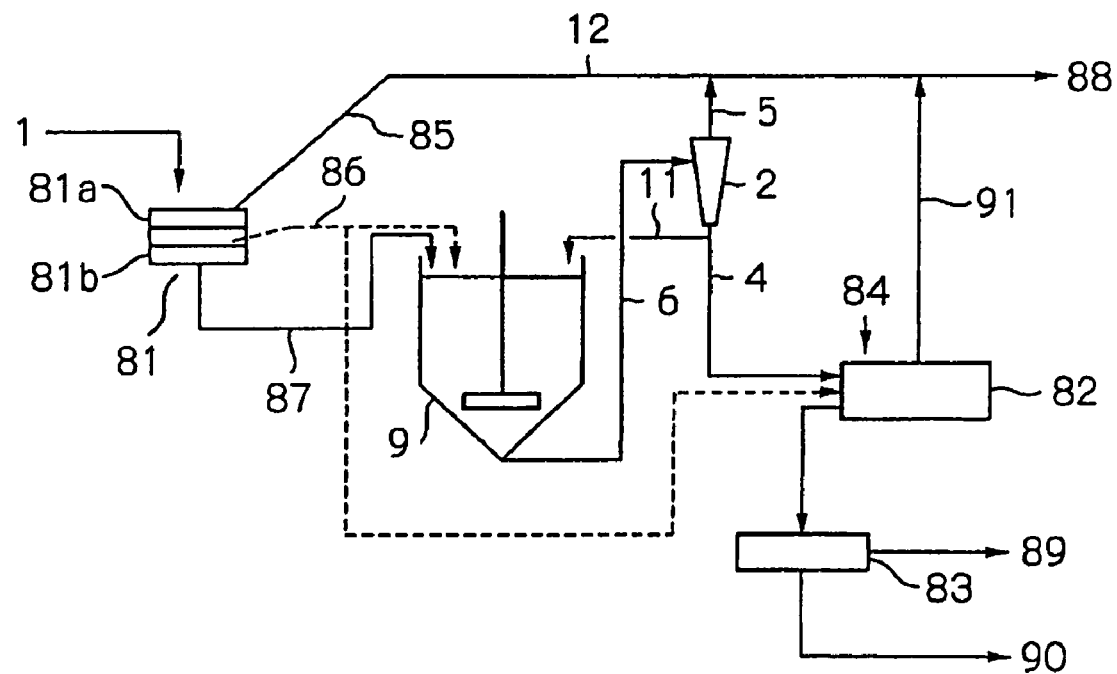
FIG. 18 is a treatment flow diagram pertaining to an embodiment of the present invention.

Furthermore, in the present invention a wet-type vibrating screen comprising two or more sieve bodies having different hole diameters may be used as a screen residue removal apparatus. FIG. 18 shows an example of a treatment flow using a two-stage, wet-type vibrating screen comprising two or more sieve bodies having different hole diameters.

FIG. 18 illustrates a treatment system in which anaerobically digested sludge generated in a sewage treatment plant serves as raw sludge 1. In this treatment system, pre-existing MAP is recovered from the sludge, further MAP is generated using phosphate ions and ammonia ions, which are soluble components of the sludge, as substrates, and the generated MAP is recovered efficiently.

According to an investigation performed by the inventors, when an iron or aluminum additive is not used in the water treatment system, the anaerobically digested sludge of sewage may contain MAP particles having a particle diameter within a range of 0.1 to 2.0 mm at approximately 0.8 g/L on average. In addition to these MAP particles, the sludge is also intermixed with a large amount of contaminant particles having a comparatively large particle diameter of at least 1.0 mm, such as screen residue, plant seed particles, hair, straw, and wood waste. The flow shown in FIG. 18 is constituted by a two-stage vibrating screen 81, the crystallization reactor 9, the hydrocyclone 2, a MAP cleaning apparatus 82, and a cleaned MAP slurry dewatering apparatus 83. First, the sludge 1 is introduced into the two-stage vibrating screen 81 comprising two sieves having different hole diameters. A first stage sieve 81a having coarse holes and a second stage sieve 81b having narrow holes are provided in the two-stage vibrating screen 81. The first stage sieve 81a is used to separate contaminants such as screen residue, while the second stage sieve 81b is used to separate MAP particles having a large particle diameter for recovery. The matter introduced into the two-stage vibrating screen 81 is divided into three types: contaminant particles 85 recovered by the first stage sieve 81a, such as screen residue, which have a comparatively large particle diameter of approximately 0.8 to 3.0 mm or greater and are not to be recovered; particles 86 constituted mainly by MAP that is to be recovered, which pass through the first stage sieve 81a and are recovered by the second stage sieve 81b, and have a particle diameter of approximately 1.0 mm; and sludge 87 containing micro-particles having a particle diameter of approximately 0.3 to less than 1.2 mm, which passes through the second sieve. Following separation from the sludge, the contaminant particles 85 such as screen residue which are separated by the upper stage coarse sieve 81a may eventually be added to the micro-particles of separated sludge following recovery of these micro-particles by the hydrocyclone 2, and be discharged. By separating contaminants such as screen residue and the like, pipe blockages in the hydrocyclone 2 and the like can be prevented, an improvement in the purity of the recovered MAP can be achieved, and by adding the contaminant particles 85 to the micro-particles of separated sludge, deterioration of the treatment performance during dewatering of the discharged sludge can be prevented. The particles 86 mainly constituted by MAP, which are separated by the lower stage narrow sieve 81b, may be recovered as MAP particles without passing through the downstream crystallization reactor 9. Alternatively, when the amount of seed crystals in the crystallization reactor 9 is insufficient during system start-up or the like, the particles 86 mainly constituted by MAP that are separated by the lower stage narrow sieve may be introduced into the crystallization reactor 9. The sludge 87 containing micro-particles which passes through the lower stage narrow sieve is introduced entirely into the downstream crystallization reactor 9. By separating the particles 86 mainly constituted by MAP from the sludge, the particle diameter of the MAP particles in the downstream crystallization reactor 9 can be controlled, and MAP accumulation or pipe blockages in the reactor 9 can be suppressed.

A magnesium source and a pH adjusting agent are added to the crystallization reactor 9 as needed, and MAP crystallization is performed using the phosphate ions and ammonia ions dissolved in the sludge as substrates. When the sludge flowing into the reactor 9 contains a large amount of comparatively large MAP particles having a particle diameter of at least 1.0 mm, the crystallization reaction in the reactor 9 causes these MAP particles to grow even larger such that the particle diameter of a part of the MAP particles may increase to several millimeters or more. When the MAP particle diameter reaches several millimeters or more, the MAP particles may accumulate in the reactor 9 or on the bottom of the pipes, causing blockages. Furthermore, a catalytic function for promoting the MAP crystallization reaction exists on the MAP particle surface, and therefore MAP generation progresses more quickly as the total surface area of the MAP particles in the sludge inside the reactor 9 increases. However, as the proportion of MAP particles having a large particle diameter in the sludge inside the reactor 9 increases, the MAP surface area decreases in relation to the MAP mass, and hence the reaction promotion effect may decrease in relation to the MAP mass. On the other hand, when the proportion of MAP particles having a small particle diameter increases, the MAP particle recovery rate in the subsequent MAP particle separation operation performed by the hydrocyclone 2 and so on may decrease. Hence, the MAP particles in the reactor 9 are preferably controlled to an appropriate size which is not too small and not too large. In the flow shown in FIG. 18, the MAP particle diameter in the MAP crystallization reactor 9 may be controlled by adjusting the particle diameter of the MAP particles which flow into the crystallization reactor 9, from among the pre-existing MAP particles in the inflowing sludge. The sludge 87 containing micro-particles which pass through the lower stage narrow sieve following separation and removal of the large MAP particles by the upper stage coarse sieve are introduced entirely into the crystallization reactor 9, but since the particle diameter of the MAP particles in this sludge is no greater than a predetermined particle diameter, the likelihood of the MAP particles accumulating in the bottom of the crystallization reactor 9 or the pipes is extremely small.

The hole diameters of the two sieves used in the two-stage wet-type vibrating screen must be selected correctly in accordance with the proportion of MAP intermixed in the contaminant particles 85, the MAP purity of the mainly MAP particles 86, the filtration resistance and required filtration area of the sieves, the relationship between the MAP particle diameter and the amount of accumulated MAP in the crystallization reaction tank, and so on. Specifically, in most cases a hole diameter of approximately 0.8 to 3.0 mm is appropriate for the first stage sieve 81a for separating the contaminant particles, and a hole diameter of approximately 0.3 to 1.2 mm is appropriate for the second stage sieve 81b for separating the mainly MAP particles. In general, the mainly MAP particles 86 separated by the second stage sieve 81b are recovered without passing through the downstream crystallization reactor 9, but if necessary, in certain cases it is effective to supply the crystallization reactor 9 with a part of the mainly MAP particles 86 in accordance with changes in the MAP particle diameter and the total MAP surface area in the crystallization reaction tank. Also, a part or all of the sludge containing MAP particles in the crystallization reactor 9 may be circulated back to the upstream two-stage vibrating screen 81 as needed so that MAP particles which have grown extremely large in the crystallization reactor 9 can be separated as a part of the mainly MAP particles and be prevented from entering the crystallization reactor 9.

Note that the particles 86 constituted mainly by MAP that are separated by the second stage sieve 81b may be introduced into the MAP particle cleaning apparatus 82 and subjected to classification and cleaning treatment.

The sludge containing MAP particles that is generated in the crystallization reactor 9 is introduced into the hydrocyclone 2 through the hydrocyclone inflow pipe 6, and the MAP particles are concentrated. The MAP particle slurry concentrated by the hydrocyclone 2 may be returned to the crystallization reactor 9 through the return pipe 11, or may be discharged appropriately via the particle discharge pipe 4 as needed in order to adjust the MAP particle concentration in the crystallization reactor 9. A part or all of the concentrated MAP slurry from the hydrocyclone 2 may be introduced into the downstream MAP cleaning apparatus 82.

In the MAP cleaning apparatus 82, the MAP particles in the concentrated MAP slurry are separated from other particles, and the MAP particles are cleaned by cleaning water 84. An apparatus which is capable of performing particle classification and cleaning simultaneously, such as a flowing film separation and classification apparatus used in a mine or the like, for example, may be employed as the MAP cleaning apparatus 82.

The sludge slurry 91 from which MAP particles have been removed by the MAP cleaning apparatus 82 may be treated as discharged sludge 88, together with the contaminants 85 such as screen residue, which are separated by the first stage sieve 81a of the two-stage vibrating screen described above, and the sludge following MAP particle separation that flows out from the overflow riser 5 of the hydrocyclone 2, and accordingly, this sludge may be subjected to treatment such as dewatering.

The MAP particles cleaned by the MAP cleaning apparatus 82 may be subjected as is to dewatering by the dewatering apparatus 83 to produce recovered matter 89. Alternatively, the MAP particles may be returned to the vibrating screen or be treated in a separation apparatus such as a magnetic separating apparatus or jig to enhance the MAP purity, and then subjected to a drying process to produce recovered matter in a dried, solid form.

Liquid 90 generated by the dewatering apparatus 83 may be returned as is to the water treatment system as waste water or subjected to dewatering treatment or the like together with the discharged sludge 88.

When heavy metal micro-particles other than MAP particles exist in the liquid 90, sludge containing these heavy metal micro-particles is preferably separated from the liquid 90 by subjecting the liquid 90 to sedimentation separation treatment prior to dewatering and so on such that only the supernatant liquid is introduced into the dewatering process and so on. By taking these measures, the effective utility value of the resultant dewatered sludge cake may be increased.

Note that in the flow in FIG. 18, the MAP cleaning apparatus 82 and dewatering apparatus 83 are not essential components, and may be omitted.

A combination of three or more types of sieve having different hole diameters may be used as the wet-type vibrating screen.

As described above, contaminants such as screen residue are removed from the sludge with the two-stage vibrating screen in advance, and prior to subsequent treatment by the crystallization reactor 9 and hydrocyclone 2, MAP particles having a large particle diameter pre-existing in the sludge are separated and recovered from the sludge slurry containing MAP micro-particles having a small particle diameter. In so doing, control of the particle diameter of the MAP particles in the crystallization reactor 9 can be performed easily, blockages of the hydrocyclone can be eliminated, and MAP particles can be separated from the sludge and concentrated with stability.

The multi-stage wet-type vibrating screen described above may be used as the screen residue removal apparatus of the flow illustrated in FIGS. 12 to 17, and may also be used as a screen residue removal apparatus in the various embodiments illustrated in FIGS. 1 to 10. Furthermore, the MAP particle cleaning apparatus 82 and dewatering apparatus 83 described above may be used as treatment apparatuses in the various embodiments described previously.

EXAMPLES

The present invention will now be described more specifically and in further detail using examples.

Examples 1 to 3 and Comparative examples 1 and 2 correspond to the embodiment described above with reference to FIGS. 1 to 3.

Example 1

In this example, a performance test was performed on a hydrocyclone using raw sludge obtained by adding MAP prepared in advance to anaerobically digested sludge at 80 g/liter. The apparatus treatment flow is shown in FIG. 1.

A two-inch cyclone was used as the hydrocyclone 2.

To increase the MAP concentration rate, the diameter of the sludge discharge pipe was set at 15 mm and the diameter of the micro-particle discharge pipe was set at 5 mm. The flow rate of the sludge introduced into the hydrocyclone 2 was set at 4 $m^3$/hr, and the introduction pressure was set at 0.45 Mpa. The supply rate of the raw sludge 1 was set at 0.6 $m^3$/hr, the circulation rate of the sludge treated by the hydrocyclone 2 (the amount circulated by the pipe 7) was set at 3.4 $m^3$/hr, and the circulation ratio (treated sludge circulation rate/raw sludge supply rate) was set at 5.7. The MAP concentration of the treated sludge 8 was 0.2 g/liter, as opposed to a MAP concentration of 80 g/liter in the raw sludge 1, and hence the MAP recovery rate was 99.8%. The discharge speed (kg/$mm^2$/hr) of the micro-particles in the micro-particle discharge pipe was 2.4 kg/$mm^2$/hr, and by keeping the discharge speed low, it was possible to perform treatment favorably without blockages.

Example 2

In this example, a phosphorus removal test was performed on digested sludge extracted from a digestion tank of a sewage treatment plant. The treatment flow is shown in FIG. 3.

The treatment flow was constituted by the sieve method screen residue removal apparatus 11, the crystallization reactor 9, and the hydrocyclone 2. The digested sludge 1 was treated by a vibrating screen having an aperture of 2.0 mm serving as the screen residue removal apparatus 11 to remove screen residue, and then introduced into the crystallization reactor 9. Magnesium chloride 10 was added to the crystallization reactor 9 to obtain an Mg/P molar ratio of 1 in relation to the orthophosphate ion concentration of the digested sludge, and a pH adjusting agent was added to adjust the pH to 8.0. The MAP concentration in the crystallization reactor 9 was maintained at 40 g/liter. Sludge obtained by mixing together a part of the sludge 6 in the crystallization reactor 9 and a part 7 of the treated sludge of the hydrocyclone 2 was supplied continuously to the hydrocyclone 2.

A two-inch cyclone was used as the hydrocyclone 2.

To increase the MAP concentration rate, the diameter of the sludge discharge pipe was set at 15 mm and the diameter of the micro-particle discharge pipe was set at 5 mm. The flow rate of the sludge introduced into the hydrocyclone 2 was set at 4 m$^3$/hr, and the introduction pressure was set at 0.45 Mpa.

In this example, and in following examples and comparative examples in which the crystallization reactor 9 and hydrocyclone 2 are used in combination, the crystal slurry concentrated by the hydrocyclone was generally returned to the crystallization reactor, and then discharged through a discharge pipe and recovered in an appropriate amount at appropriate intervals (for example, once or plural times a day) on the basis of the MAP precipitation amount, which was predicted in accordance with properties such as the phosphorus concentration of the raw water.

The supply rate of the raw sludge 1 was set at 0.25 m$^3$/hr. The supply rate of the sludge 6 in the crystallization reactor was 0.5 m$^3$/hr while the circulation rate of the sludge treated by the hydrocyclone 2 was 3.5 m$^3$/hr, and hence the total sludge supply rate to the hydrocyclone 2 was 4 m$^3$/hr. The circulation ratio was set at 7.

In relation to 800 mg/liter of T—P and 300 mg/liter of PO$_4$—P in the raw sludge 1, the treated sludge 8 contained 350 mg/liter of T—P and 10 mg/liter of PO$_4$—P, and hence the phosphorus recovery rate was 56%. At least 95% of the recovered matter was MAP. In this case, the discharge speed (kg/mm$^2$/hr) of the micro-particles in the micro-particle discharge pipe was 1.0 kg/mm$^2$/hr, and by keeping the discharge speed low, it was possible to perform treatment favorably without blockages.

Example 3

In this example, a blockage condition was confirmed by circulating raw sludge having a MAP concentration of 55 g/L at a modified circulation ratio (circulated sludge amount/raw sludge amount). The treatment flow shown in FIG. 1 was employed. A two-inch cyclone was used as the hydrocyclone 2, the over diameter (the diameter of the sludge discharge pipe) was set at 14 mm, and the under diameter (the diameter of the micro-particle discharge pipe) was set at 5 mm. The flow rate of the sludge introduced into the hydrocyclone 2 was set at 4 m$^3$/hr, i.e. the sum total of the circulated sludge 7 amount and the raw sludge amount.

Figure 19:
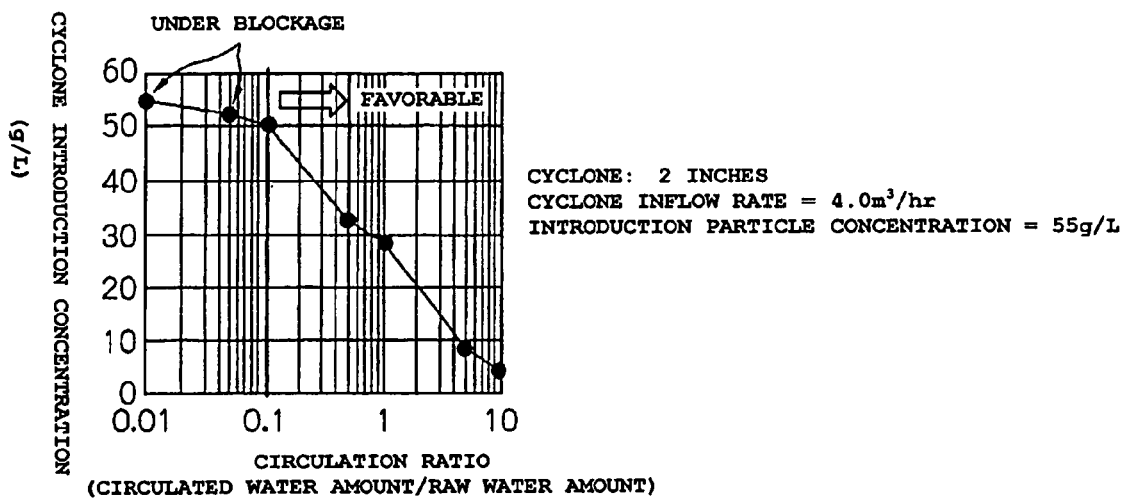
FIG. 19 is a graph showing the relationship between a sludge circulation ratio in a hydrocyclone and a MAP concentration following circulation, determined in example 3.

FIG. 19 shows the relationship between the circulation ratio and the MAP concentration following circulation (the MAP concentration of the sludge that is introduced into the hydrocyclone 2). At circulation ratios of 0.01 and 0.05, the cyclone under (the base portion of the hydrocyclone 2 and the micro-particle discharge pipe) was blocked, and in this case no treatment could be performed. At a circulation ratio of 0.1 or greater, it was possible to perform treatment favorably with no blockages. Thus it was found that the sludge circulation ratio is preferably set to 0.1 or more.

Comparative Example 1

Comparative Example with Example 1

Figure 20:
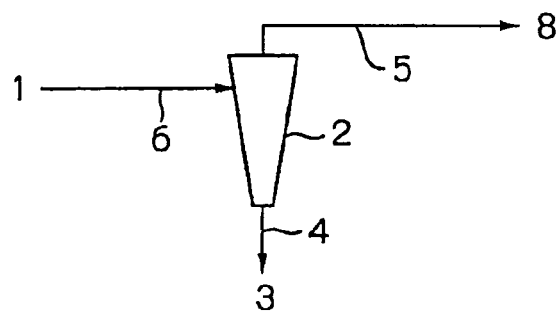
FIG. 20 is a flow diagram of apparatuses used in comparative example 1.

This comparative example corresponds to Example 1. Similarly to Example 1, a performance test was performed on the hydrocyclone using raw sludge containing MAP at a concentration of 80 g/liter. The apparatus flow is shown in FIG. 20.

A similar hydrocyclone to that of Example 1 was used as the hydrocyclone 2. The raw sludge 1 supply rate was set at 4 m$^3$/hr, and the treated sludge 8 of the hydrocyclone 2 was not returned such that the circulation rate (treated sludge circulation rate/raw sludge supply rate) was zero. A blockage occurred within one minute of the beginning of raw sludge 1 supply to the hydrocyclone 2, rendering separation impossible. The cause of the blockage was determined to be the high MAP concentration of the raw sludge 1. In this case, the discharge speed (kg/mm$^2$/hr) of the micro-particles in the micro-particle discharge pipe was 16 kg/mm$^2$/hr, and since the circulation ratio was zero, it is believed that the high discharge speed caused the blockage.

Comparative Example 2

Comparative Example with Example 2

Figure 21:
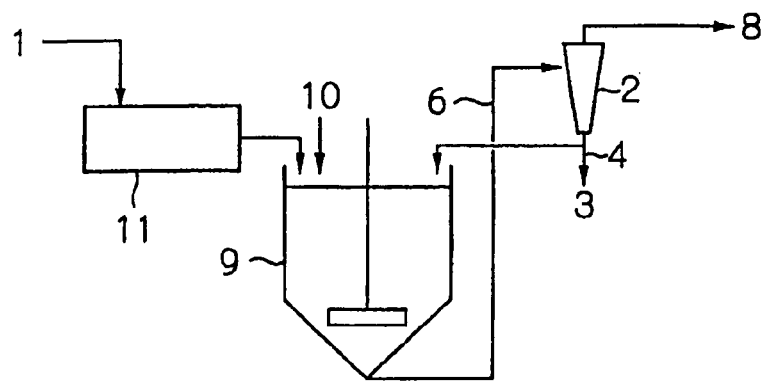
FIG. 21 is a flow diagram of apparatuses used in comparative example 2.

This comparative example corresponds to Example 2. Similar sludge to that of Example 2 was used as the raw sludge. The treatment flow is shown in FIG. 21. Similarly to Example 2, the treatment flow was constituted by the screen residue removal apparatus 11, the crystallization reactor 9, and the hydrocyclone 2.

Similarly to Example 2, magnesium chloride 10 was added to the crystallization reactor 9 to obtain an Mg/P molar ratio of 1 in relation to the orthophosphate ion concentration of the digested sludge, and a pH adjusting agent was added to adjust the pH to 8.0. The MAP concentration in the crystallization reactor 9 was maintained at 40 g/liter.

The raw sludge supply rate was set at 0.25 m$^3$/hr, the circulation ratio (treated sludge circulation rate/raw sludge supply rate) was set at zero, and the sludge in the crystallization reactor 9 was supplied to the hydrocyclone 2 intermittently at 4 m$^3$/hr.

The raw sludge contained 800 mg/liter of T—P and 300 mg/liter of PO$_4$—P, whereas the treated sludge 8 contained 900 mg/liter of T—P and 10 mg/liter of PO$_4$—P, and hence the phosphorus recovery rate was −13%. Since the T—P content of the treated sludge was greater than the T—P content of the raw sludge, it is believed that MAP in the reactor flowed out into the treated sludge. In this case, the discharge speed (kg/mm$^2$/hr) of the micro-particles in the micro-particle discharge pipe was 8.0 kg/mm$^2$/hr, and although blockages did not occur, the high discharge speed caused MAP particles to flow out into the treated sludge, resulting in a low recovery rate.

Example 4

Examples 4 to 8 and Comparative Examples 3 and 4 correspond to the embodiment described above with reference to FIGS. 4 to 6.

Figure 22:
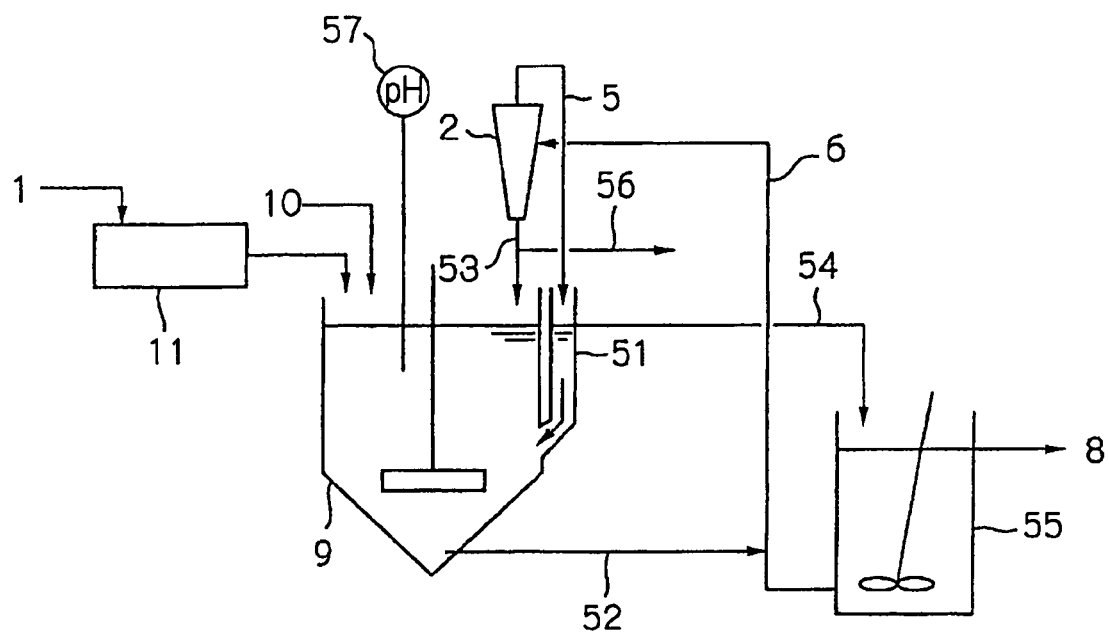
FIG. 22 is a flow diagram of apparatuses used in example 4.

In Example 4, a test was performed on digested sludge extracted from a digestion tank of a sewage treatment plant to recover phosphorus in the form of magnesium ammonium phosphate. The treatment flow is shown in FIG. 22.

The treatment flow was constituted by the sieve method screen residue removal apparatus 11, the crystallization reactor 9, the hydrocyclone 2, and the circulating water tank 55. The digested sludge 1 was treated by a vibrating screen having an aperture of 2.0 mm serving as the screen residue removal apparatus 11 to remove screen residue, and then introduced into the crystallization reactor 9.

Magnesium chloride 10 was added to the crystallization reactor 9 to obtain an Mg/P molar ratio of 1 in relation to the orthophosphate ion concentration of the digested sludge, and a pH adjusting agent was added to adjust the pH to 8.0 while monitoring the pH in the reactor 9 using the pH meter 57. The MAP concentration in the crystallization reactor 9 was maintained at 80 g/liter.

Particles extracted from the particle extraction pipe 52 connected to the base portion of the reactor 9 were supplied to the hydrocyclone inflow pipe 6, and then supplied to the hydrocyclone 2 continuously together with circulated water. A two-inch hydrocyclone was used as the hydrocyclone 2. The diameter of the sludge discharge pipe of the hydrocyclone 2 was set at 14 mm and the diameter of the particle discharge pipe was set at 9.4 mm. The introduction rate into the hydrocyclone 2 was set at 4 m$^3$/hr, and the introduction pressure was set at 0.40 Mpa. All of the effluent water from the overflow riser 5 of the hydrocyclone was returned to the return pipe 51 connected to the crystallization reactor 9.

The sludge supply rate to the crystallization reactor 9 was set at 0.25 m$^3$/hr, and the sludge extraction rate from the crystallization reactor 9 was set at 1.5 m$^3$/hr.

The raw sludge 1 contained 800 mg/liter of T—P and 300 mg/liter of $PO_4$—P, whereas the treated sludge 8 had a T—P content of 350 mg/liter and a $PO_4$—P content of 10 mg/liter, and hence the phosphorus recovery rate was 56%. At least 95% of the recovered matter was MAP.

Example 5

Figure 23:
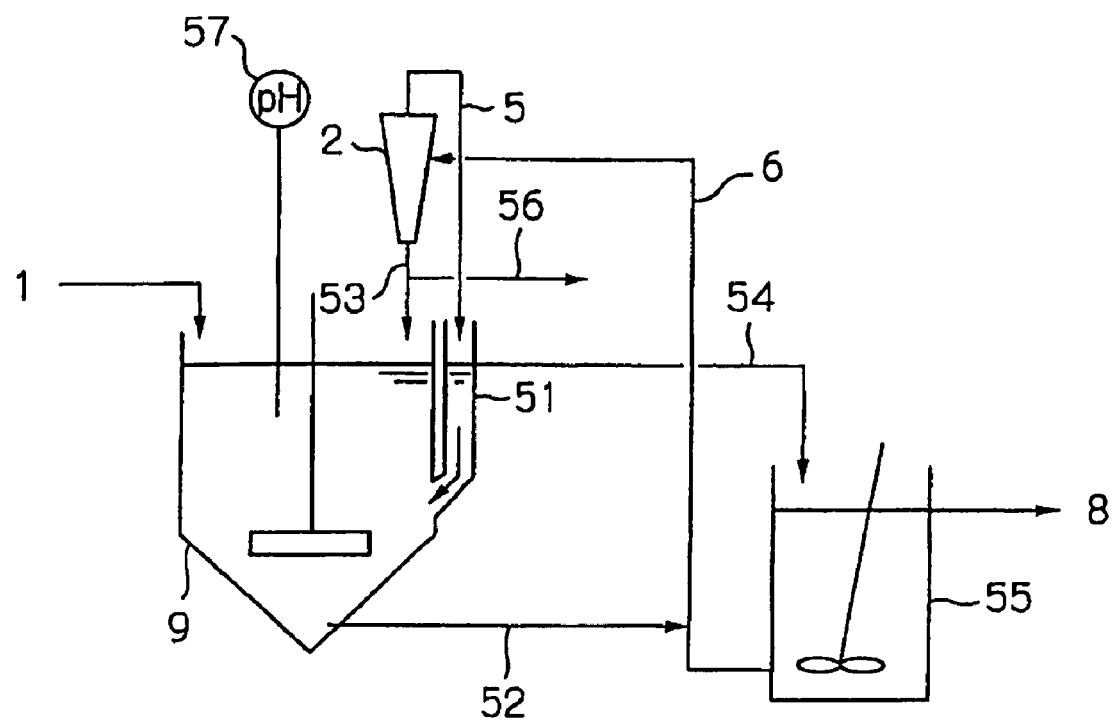
FIG. 23 is a flow diagram of apparatuses used in example 5.

In this example, refuse leachate was treated to remove calcium chloride by precipitating calcium carbonate particles. The treatment apparatuses were constituted by the crystallization reactor 9, the hydrocyclone 2, and the circulating water tank 55. The treatment flow is shown in FIG. 23.

In the crystallization reactor 9, refuse leachate (referred to as raw water hereafter) was supplied to the base portion of the reactor 9, and a 5% sodium carbonate aqueous solution was also supplied to the base portion of the reactor 9. The sodium carbonate addition amount was set so as to obtain a C/Ca molar ratio of 1:1 in relation to the calcium concentration of the sludge introduced into the crystallization reactor 9. The reaction pH was set at 8.0. The calcium carbonate concentration in the crystallization reactor 9 was maintained at 80 g/L.

The particles extracted from the particle extraction pipe 52 of the crystallization reactor 9 were supplied to the hydrocyclone inflow pipe 6 and then supplied to the hydrocyclone 2 continuously together with circulated water. A two-inch hydrocyclone was used as the hydrocyclone 2. The diameter of the sludge discharge pipe of the hydrocyclone 2 was set at 14 mm and the diameter of the particle discharge pipe was set at 9.4 mm. The introduction rate into the hydrocyclone was set at 4 m$^3$/hr, and the introduction pressure was set at 0.40 Mpa.

The raw sludge supply rate to the crystallization reactor 9 was set at 0.25 m$^3$/hr, and the extraction rate of the sludge containing MAP particles from the crystallization reactor 9 was set at 1.5 m$^3$/hr.

The raw water 1 had a pH of 7.2 and a Ca concentration of 3000 mg/L, whereas the treated water 8 had a pH of 8.0 and a Ca concentration of 100 mg/L. Hence, a calcium removal rate of at least 95% was obtained.

Comparative Example 3

Comparative Example of Example 4

Figure 24:
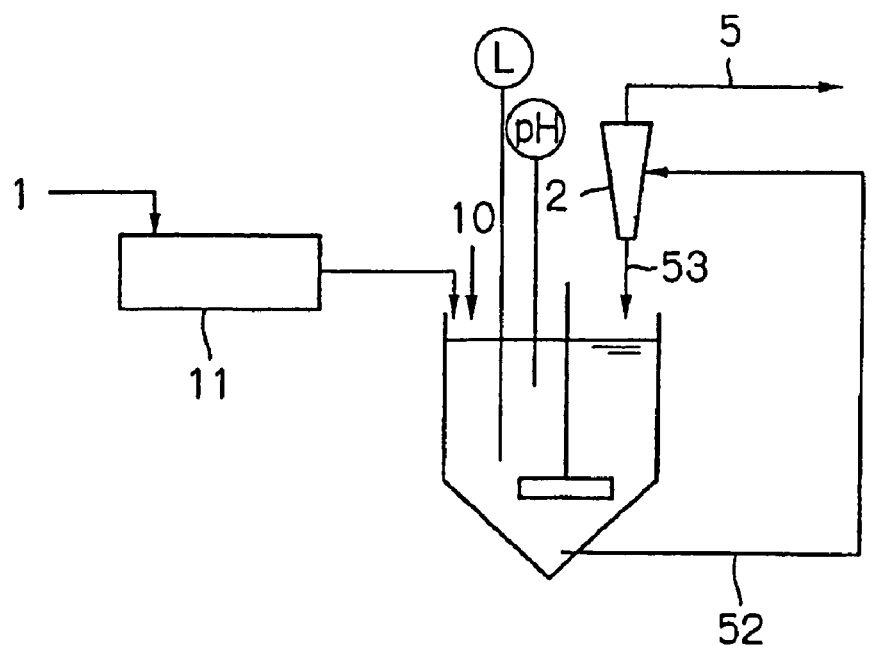
FIG. 24 is a flow diagram of apparatuses used in comparative example 3.

This comparative example corresponds to Example 4. Similar sludge to that of Example 4 was used as the raw sludge. The treatment flow is shown in FIG. 24. Similarly to Example 4, the treatment flow was constituted by the screen residue removal apparatus 11, the crystallization reactor 9, and the hydrocyclone 2. In the following, where specific description to the contrary is not provided, it is assumed that identical treatment to that of Example 4 was performed.

Similarly to Example 4, magnesium chloride was added to the crystallization reactor 9 to obtain an Mg/P molar ratio of 1 in relation to the orthophosphate ion concentration of the digested sludge, and a pH adjusting agent was added to adjust the pH to 8.0. Prior to the operation, the MAP concentration in the crystallization apparatus was set at 80 g/L.

The raw sludge 1 supply rate to the crystallization reactor 9 was set at 0.25 m$^3$/hr, and the sludge in the crystallization reactor 9 was supplied to the hydrocyclone 2 intermittently via the extraction pipe 52 at 4 m$^3$/hr. Sludge supply to the hydrocyclone 2 was on-off controlled in accordance with the numerical value of a level meter (L).

The raw sludge contained 800 mg/L of T—P and 300 mg/L of $PO_4$—P, whereas the treated sludge had a T—P content of 900 mg/L and a $PO_4$—P content of 10 mg/L, and hence the phosphorus recovery rate was −13%. Three hours after the beginning of the operation, a blockage occurred in the cyclone under (the micro-particle discharge pipe). With this system, it was difficult to perform stable treatment.

Comparative Example 4

Comparative Example with Example 4

Figure 25:
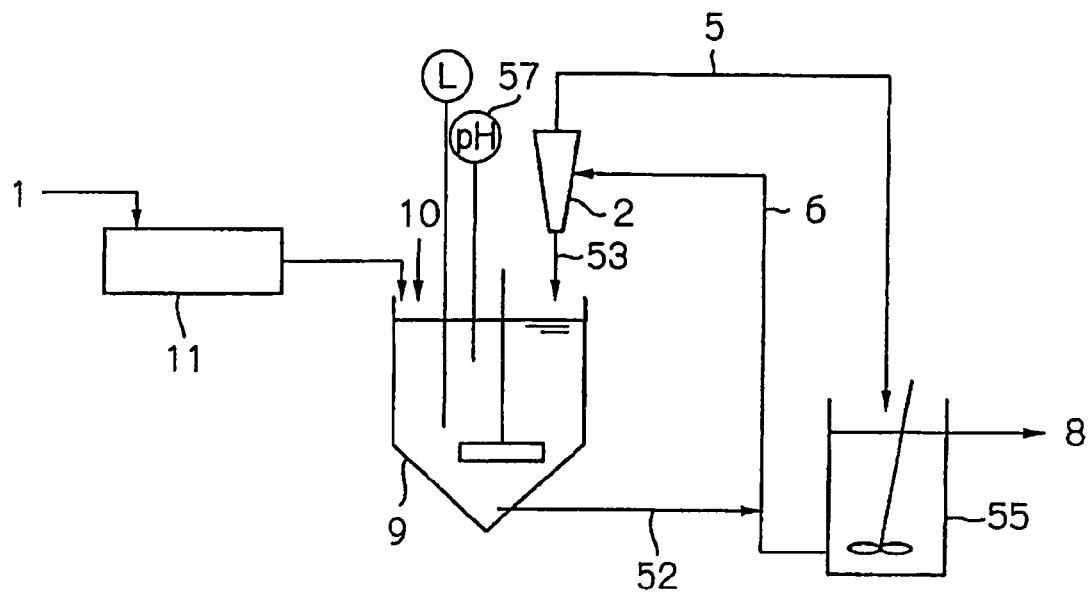
FIG. 25 is a flow diagram of apparatuses used in comparative example 4.

This comparative example corresponds to Example 4. Similar sludge to that of Example 4 was used as the raw sludge. The treatment flow is shown in FIG. 25. The treatment flow was constituted by the screen residue removal apparatus 11, the crystallization reactor 9, the hydrocyclone 2, and the circulating water tank 55. In the following, where specific description to the contrary is not provided, it is assumed that identical treatment to that of Example 4 was performed.

Magnesium chloride 10 was added to the crystallization reactor 9 to obtain an Mg/P molar ratio of 1 in relation to the orthophosphate ion concentration of the digested sludge, and a pH adjusting agent was added to adjust the pH to 8.0. The MAP concentration in the crystallization apparatus was maintained at 80 g/L.

The particles extracted from the particle extraction pipe 52 at the base portion of the crystallization reactor 9 were supplied to the hydrocyclone inflow pipe 6 and then supplied to the hydrocyclone 2 continuously together with circulated water. A two-inch cyclone was used as the hydrocyclone 2. The diameter of the sludge discharge pipe of the hydrocyclone 2 was set at 14 mm and the diameter of the particle discharge pipe was set at 9.4 mm. The introduction rate into the hydrocyclone 2 was set at 4 m$^3$/hr, and the introduction pressure was set at 0.40 Mpa. Introduction water supply to the hydrocyclone was on-off controlled in accordance with the numerical value of a level meter (L) provided in the crystallization reactor 9. All of the sludge flowing out from the overflow riser 5 of the hydrocyclone was supplied to the circulating water tank.

The raw sludge 1 supply rate to the crystallization reactor 9 was set at 0.25 m$^3$/hr, and the sludge extraction rate from the crystallization reactor 9 was set at 1.5 m$^3$/hr.

The raw sludge 1 had a T—P content of 800 mg/L and a $PO_4$—P content of 300 mg/L, whereas the treated sludge 8 had a T—P content of 400 mg/L and a $PO_4$—P content of 10 mg/L, and hence the phosphorus recovery rate was 50%. At least 95% of the recovered matter was MAP.

In comparison to Example 4, the recovery rate was lower, and moreover stability was insufficient due to variation in the water level, variation in the treated water quality caused by variation in the particle concentration inside the reactor, and so on.

Example 6

Figure 26:
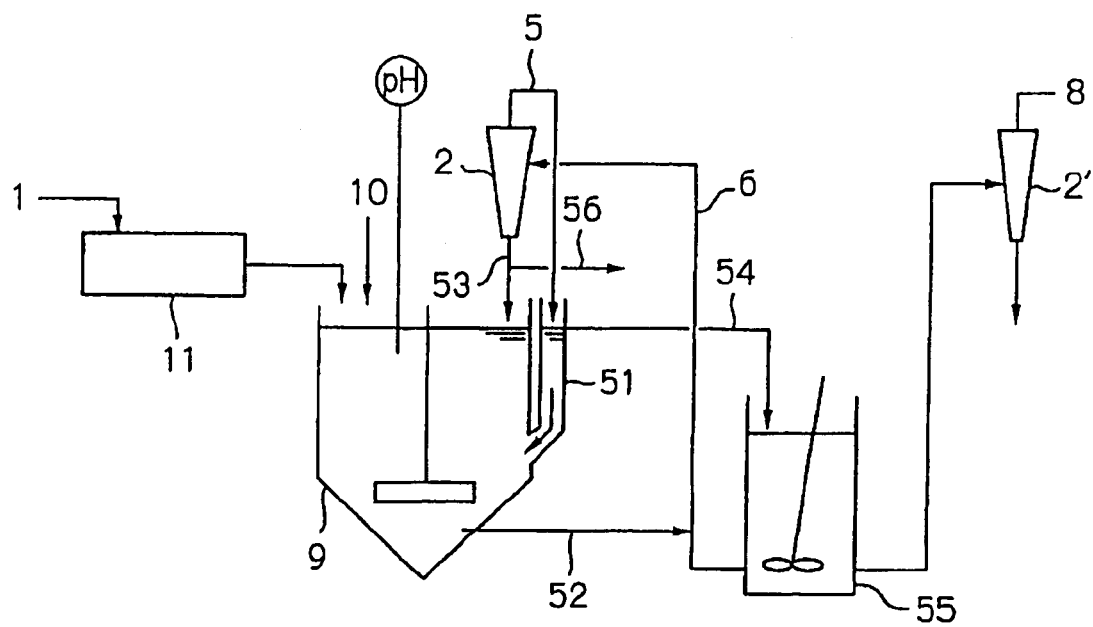
FIG. 26 is a flow diagram of apparatuses used in example 6.

In this example, a test was performed on digested sludge extracted from a digestion tank of a sewage treatment plant to recover phosphorus in the form of magnesium ammonium phosphate (MAP). The treatment flow is shown in FIG. 26. An improvement in the MAP particle recovery rate was intended by disposing two hydrocyclones in series.

The treatment flow was constituted by the sieve method screen residue removal apparatus 11, the crystallization reactor 9, the two hydrocyclones 2, 2', and the circulating water tank 55. In the following, where specific description to the contrary is not provided, it is assumed that identical treatment to that of Example 4 was performed.

Magnesium chloride 10 was added to the crystallization reactor 9 to obtain an Mg/P molar ratio of 1 in relation to the orthophosphate ion concentration of the digested sludge, and a pH adjusting agent was added to adjust the pH to 8.0. The MAP concentration in the crystallization apparatus was maintained at 80 g/L.

The MAP particles extracted from the particle extraction pipe 52 at the base portion of the crystallization reactor 9 were supplied to the hydrocyclone inflow pipe 6 and then supplied to the hydrocyclone 2 continuously together with circulated water. A two-inch cyclone was used as the hydrocyclone 2. The diameter of the sludge discharge pipe of the hydrocyclone 2 was set at 14 mm and the diameter of the particle discharge pipe was set at 9.4 mm. The inflowing water introduction rate into the hydrocyclone was set at 4 $m^3$/hr, and the introduction pressure was set at 0.40 Mpa. All of the sludge flowing out from the overflow riser 5 of the hydrocyclone was returned to the return pipe 51 connected to the crystallization reactor 9.

The raw sludge 1 supply rate to the crystallization reactor 9 was set at 0.25 $m^3$/hr, and the sludge extraction rate from the crystallization reactor 9 was set at 1.5 $m^3$/hr.

An identical two-inch cyclone to the first stage hydrocyclone 2 was used as the second stage hydrocyclone 2'. The second stage hydrocyclone 2' was provided with the aim of recovering the micro-particles that flow out from the overflow riser 5 of the first stage hydrocyclone 2. Effluent water from the circulating water tank 55 was introduced into the second stage hydrocyclone 2'. The inflow rate into the second stage hydrocyclone 2' was set at 4 $m^3$/hr, and the introduction operation was performed intermittently.

The raw sludge 1 had a T—P content of 800 mg/L and a $PO_4$—P content of 300 mg/L, whereas the treated sludge 8 had a T—P content of 320 mg/L and a $PO_4$—P content of 10 mg/L, and hence the phosphorus recovery rate was 60%. By providing two cyclones in series, an improvement in the phosphorus recovery rate was achieved.

Example 7

Figure 27:
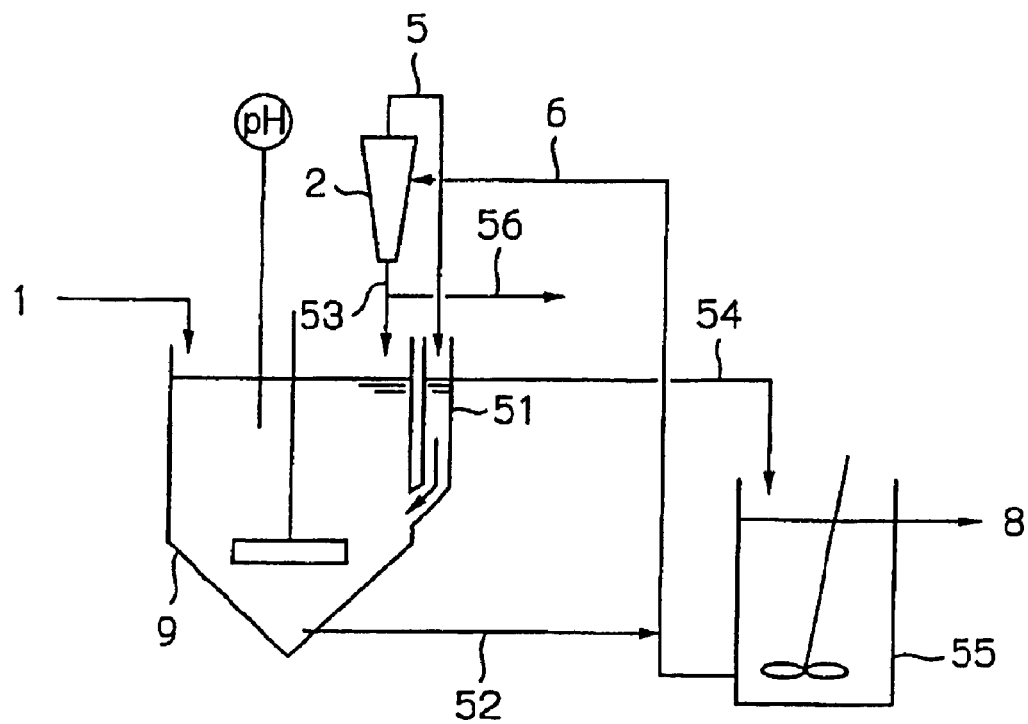
FIG. 27 is a flow diagram of apparatuses used in example 7.

In this example, a test was performed to recover phosphorus in the form of hydroxyapatite from separated water (raw water hereafter) obtained in a process for concentrating the excess sludge of a sewage treatment plant. The treatment flow is shown in FIG. 27.

The treatment flow was constituted by the crystallization reactor 9, the hydrocyclone 2, and the circulating water tank 55. In the following, where specific description to the contrary is not provided, it is assumed that identical treatment to that of Example 4 was performed.

In the crystallization reactor 9, rock phosphate was floated in advance as seed crystals. Calcium chloride was added to obtain a Ca/P weight ratio of 5.6 in relation to the orthophosphate ion concentration of the raw water, and a pH adjusting agent was added to adjust the pH to 8.3. The phosphate rock concentration in the crystallization reactor 9 was maintained at 80 g/L.

The particles extracted from the particle extraction pipe 52 at the base portion of the crystallization reactor 9 were supplied to the hydrocyclone inflow pipe 6 and then supplied to the hydrocyclone 2 continuously together with circulated water. A two-inch cyclone was used as the hydrocyclone. The diameter of the sludge discharge pipe of the hydrocyclone 2 was set at 14 mm and the diameter of the particle discharge pipe was set at 9.4 mm. The inflow rate into the hydrocyclone 2 was set at 4 $m^3$/hr, and the introduction pressure was set at 0.40 Mpa.

The raw water supply rate to the crystallization reactor 9 was set at 0.25 $m^3$/hr, and the sludge extraction rate from the crystallization reactor 9 was set at 1.5 $m^3$/hr. All of the sludge flowing out from the overflow riser 5 of the hydrocyclone was returned to the return pipe 51 connected to the crystallization reactor 9.

In relation to 46 mg/L of T—P and 45 mg/L of $PO_4$—P in the raw water, treated water contained 3.2 mg/L of T—P and 2.0 mg/liter of $PO_4$—P, and hence the phosphorus recovery rate was 93%.

Example 8

Figure 28:
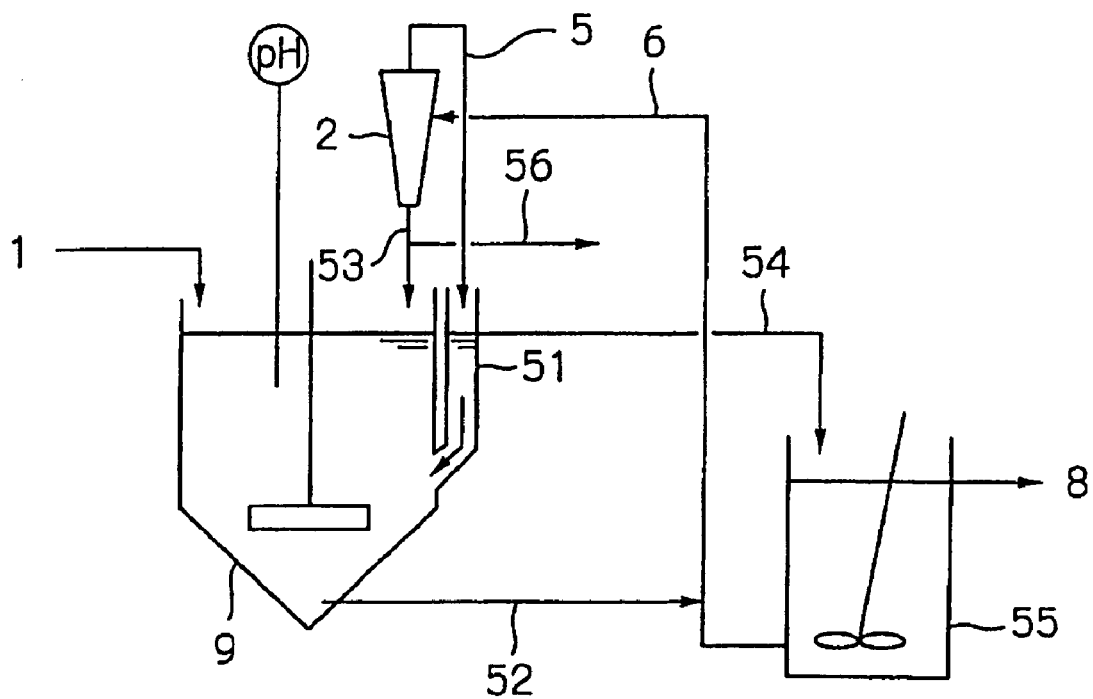
FIG. 28 is a flow diagram of apparatuses used in example 8.

In this example, a test was performed to recover fluorine in the form of calcium fluoride from the waste water (referred to as raw water hereinafter) of a semiconductor manufacturing factory. The treatment flow is shown in FIG. 28.

The treatment flow was constituted by the crystallization reactor 9, the hydrocyclone 2, and the circulating water tank 55.

In the crystallization reactor 9, calcium fluoride crystals were floated in advance as seed crystals. Calcium chloride was added to obtain a Ca/F weight ratio of 1.5 in relation to the fluorine ion concentration of the raw water, and a pH adjusting agent was added to adjust the pH to 6.5. The calcium fluoride concentration in the crystallization reactor 9 was maintained at 80 g/L.

The particles extracted from the particle extraction pipe 52 at the base portion of the crystallization reactor 9 were supplied to the hydrocyclone inflow pipe 6 and then supplied to the hydrocyclone 2 continuously together with circulated water. A two-inch cyclone was used as the hydrocyclone 2. The diameter of the sludge discharge pipe of the hydrocyclone 2 was set at 14 mm and the diameter of the particle discharge pipe was set at 9.4 mm. The inflow rate into the hydrocyclone 2 was set at 4 $m^3$/hr, and the introduction pressure was set at 0.40 Mpa.

The raw water 1 supply rate to the crystallization reactor 9 was set at 0.15 $m^3$/hr, and the rate at which the particle-containing sludge was extracted from the crystallization reactor 9 was set at 1.5 $m^3$/hr.

The raw water 1 had a fluorine concentration of 600 mg/L, whereas the treated water 8 had a fluorine concentration of 8 mg/L, and hence the fluorine recovery rate was at least 95%.

Example 9

Examples 9 to 11 and Comparative Example 5 correspond to the embodiment described above with reference to FIGS. 7 to 10. A phosphorus removal test was performed on digested sludge extracted from a digestion tank of a sewage treatment plant. Prior to introduction into the crystallization reactor, screen residue was removed from the sludge using an identical screen residue removal apparatus to that of Example 2.

Figure 29:
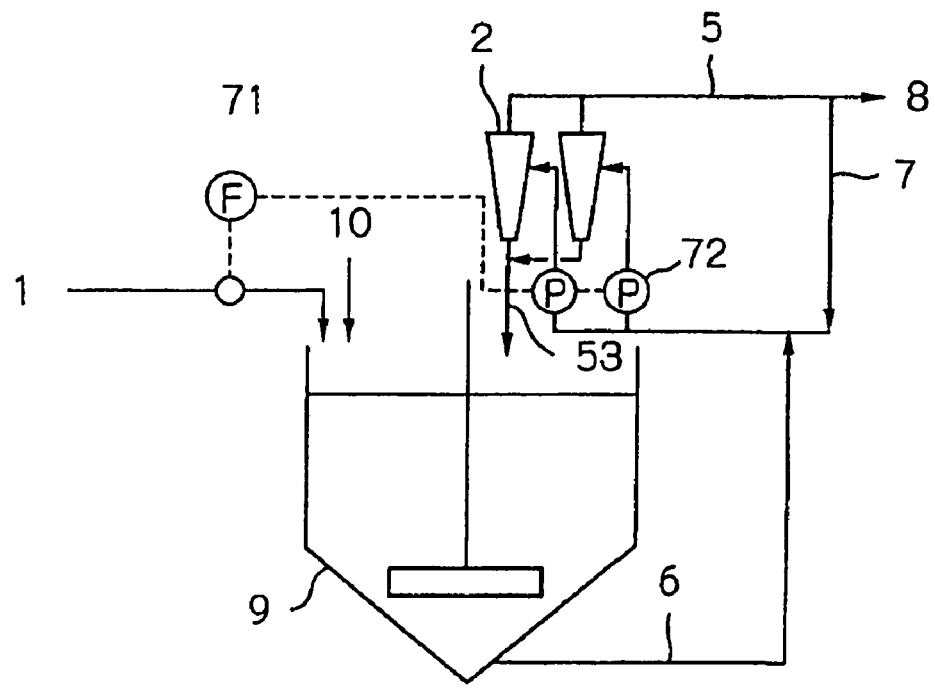
FIG. 29 is a flow diagram of apparatuses used in example 9.

The treatment flow of Example 9 is shown in FIG. 29. The treatment flow was constituted by the crystallization reactor 9 and two hydrocyclones 2 disposed in series.

Following treatment by the sieve method screen residue removal apparatus, the digested sludge was introduced into the crystallization reactor 9. Magnesium chloride 10 was added to the crystallization reactor 9 to obtain an Mg/P molar ratio of 1 in relation to the orthophosphate ion concentration of the digested sludge, and a pH adjusting agent was added to adjust the pH to 8.0. Two-inch cyclones were used as the hydrocyclones 2. The diameter of the sludge discharge pipe of the hydrocyclones 2 was set at 14 mm and the diameter of the particle discharge pipe was set at 8 mm. Sludge obtained by mixing together the sludge 6 extracted from the base portion of the crystallization reactor 9 and a part of the treated sludge flowing out from the overflow riser 5 of the hydrocyclones was supplied continuously to the hydrocyclones 2 via the return pipe 7. The flow rate of the sludge introduced into one hydrocyclone was set at 4 $m^3$/hr, and the introduction pressure was set at 0.45 Mpa.

The inflow rate of the raw sludge was monitored by the flow meter 71, and on-off control was performed by a pump 72 such that when the inflow rate of the raw sludge 1 fell to or below 0.25 $m^3$/hr, only one of the hydrocyclones was activated, and when the inflow rate of the raw sludge 1 was between 0.25 and 0.5 $m^3$/hr, both of the hydrocyclones were activated.

The MAP concentration in the crystallization reactor 9 was maintained at no less than 100 g/L regardless of variation in the inflow rate of the raw sludge 1 between 0.15 and 0.50 $m^3$/hr. The raw sludge 1 had a T—P content of 800 mg/liter and a $PO_4$—P content of 300 mg/liter, whereas the treated sludge 8 had a T—P content of 350 mg/liter and a $PO_4$—P content of 10 mg/liter, and hence the phosphorus recovery rate was 56%. At least 95% of the recovered matter was MAP.

Example 10

Figure 30:
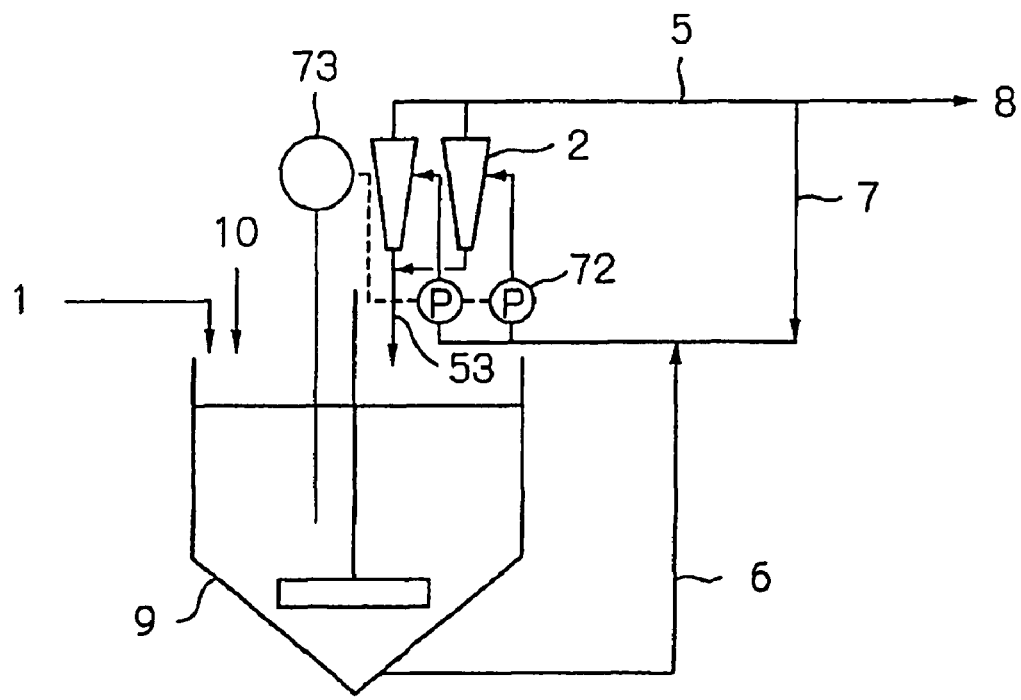
FIG. 30 is a flow diagram of apparatuses used in example 10.

In this example, the sludge concentration meter 73 was disposed in the crystallization reactor 9, and the number of operational hydrocyclones 2 was controlled by monitoring the sludge concentration in the reactor 9. The treatment is shown in FIG. 30. Note that the sludge concentration measured by monitoring was converted into a MAP concentration using a calibration curve prepared in advance.

The treatment flow was constituted by the crystallization reactor 9 and two hydrocyclones 2. In the following, where specific description to the contrary is not provided, it is assumed that identical treatment to that of Example 9 was performed.

The crystallization reactor 9 and hydrocyclones 2 employed in this example were similar to those of Example 9. Sludge obtained by mixing together the sludge 6 extracted from the base portion of the crystallization reactor and a part of the treated sludge flowing out from the overflow riser 5 of the hydrocyclones was supplied continuously to the hydrocyclones 2 via the return pipe 7. The inflow rate into one hydrocyclone was set at 4 $m^3$/hr, and the introduction pressure was set at 0.45 Mpa.

Control was performed by the pump 72 such that when the MAP concentration in the reactor 9 fell to or below 100 g/L, both of the hydrocyclones 2 were operated, and when the MAP concentration exceeded 100 g/L, one of the hydrocyclones was halted and the other was operated.

The properties of the treated sludge remained stable regardless of variation in the flow rate of the raw sludge between 0.15 and 0.50 $m^3$/hr. The raw sludge had a T—P content of 800 mg/L and a $PO_4$—P content of 300 mg/L, whereas the treated sludge had a T—P content of 350 mg/L and a $PO_4$—P content of 10 mg/L, and hence the phosphorus recovery rate was 56%. At least 95% of the recovered matter was MAP.

Example 11

Figure 31:
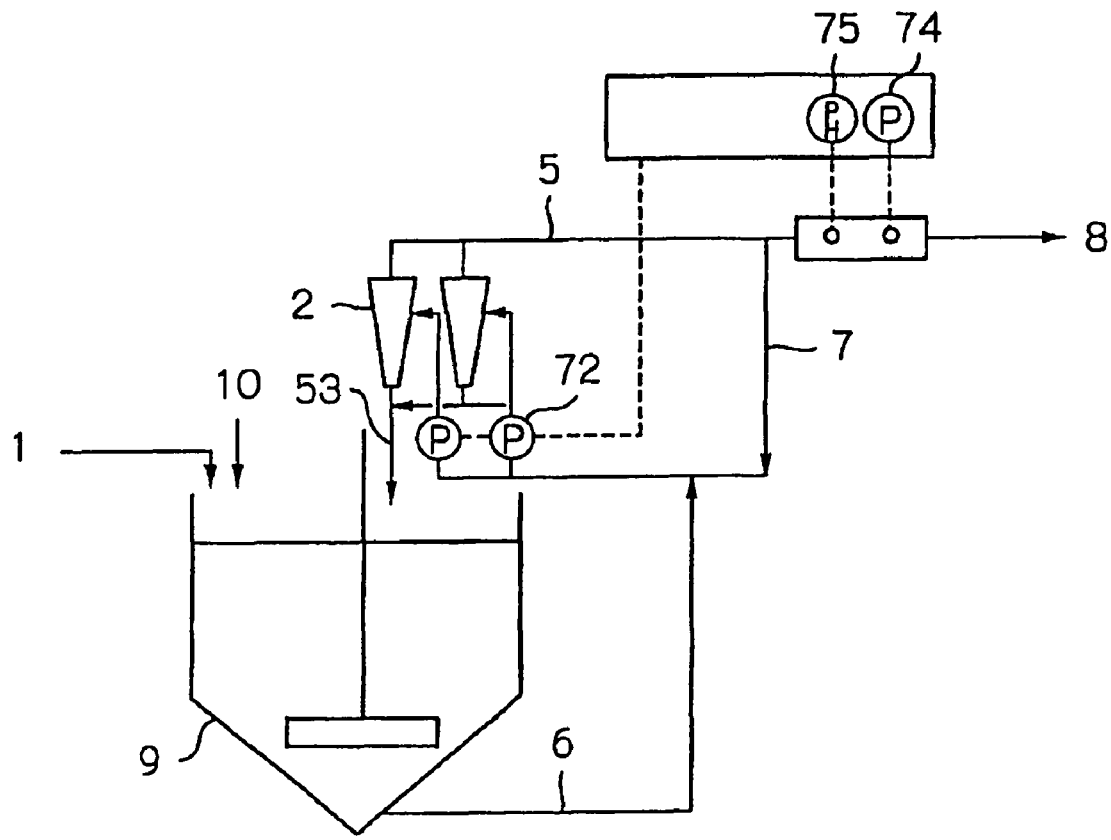
FIG. 31 is a flow diagram of apparatuses used in example 11.

In this example, treatment was performed using a treatment flow such as that shown in FIG. 31. Digested sludge 1 obtained by subjecting excess sludge to anaerobic digestion in an anaerobic digestion tank at 35° C. was used as the raw sludge. The pH and phosphorus concentration of the treated sludge flowing out from the overflow riser of the hydrocyclone were monitored, and a supersaturation value was calculated. The number of operational hydrocyclones was then controlled on the basis of the calculation value.

The treatment flow was constituted by the crystallization reactor 9 and two hydrocyclones 2. In the following, where specific description to the contrary is not provided, it is assumed that identical treatment to that of Example 9 was performed.

The crystallization reactor 9 and hydrocyclones 2 employed in this example were similar to those of Example 9. Sludge obtained by mixing together the sludge 6 extracted from the base portion of the crystallization reactor and a part of the treated sludge flowing out from the overflow riser 5 of the hydrocyclones was supplied continuously to the hydrocyclones 2 via the return pipe 7. The inflow rate into one hydrocyclone was set at 4 $m^3$/hr, and the introduction pressure was set at 0.45 Mpa.

The pH and phosphorus concentration of the treated sludge 8 flowing out from the overflow riser 5 of the hydrocyclones were monitored using the phosphorus concentration meter 74 and pH meter 75. The pH and the phosphate-phosphorus ion concentration were measured by a monitoring apparatus using a pH electrode and a calorimetric method. Note that the phosphate-phosphorus concentration was measured by dissolving MAP at a sludge pH of 3. The elution of biological phosphorus at pH 3 was not detected.

The supersaturation ratio was calculated using the pH and phosphate-phosphorus ion concentration measured by the monitoring apparatus, together with ammonia nitrogen at 600 mg/L and Mg at 50 mg/L. When the supersaturation ratio was 25 or less, one hydrocyclone was made operational, and when the supersaturation ratio exceeded 25, two hydrocyclones were made operational.

The properties of the treated sludge remained stable regardless of variation in the raw sludge flow rate between 0.15 and 0.50 $m^3$/hr. The raw sludge had a T—P content of 800 mg/L and a $PO_4$—P content of 300 mg/L, whereas the treated sludge had a T—P content of 350 mg/L and a $PO_4$—P content of 10 mg/L, and hence the phosphorus recovery rate was 56%. At least 95% of the recovered matter was MAP. The high supersaturation ratio was due to the large number of precipitated MAP micro-particles. In this case, two hydrocyclones were made operational in order to raise the MAP concentration in the crystallization reactor, and as a result the recovery rate increased.

Comparative Example 5

Comparative Example with Example 9

Figure 32:
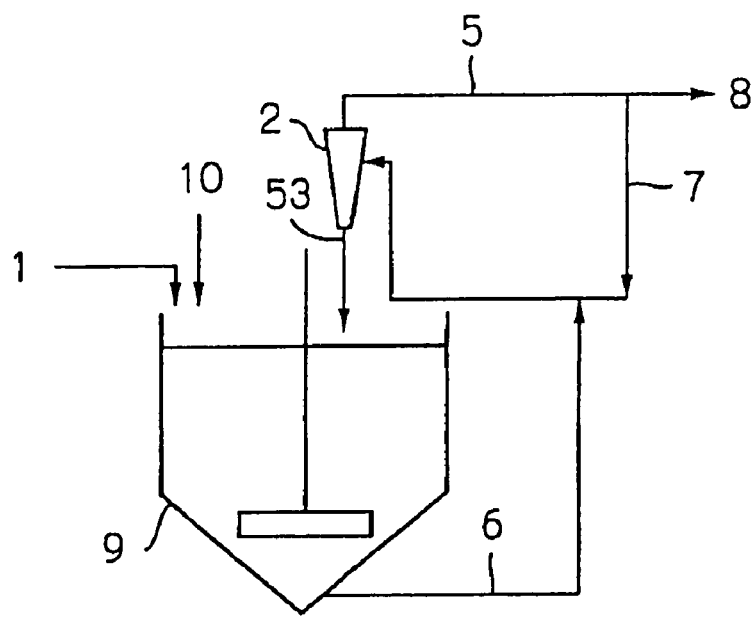
FIG. 32 is a flow diagram of apparatuses used in comparative example 5.

This example is a comparative example with Example 9, in which a similar phosphorus removal test to that of Example 9 was performed. The treatment flow is shown in FIG. 32.

The treatment flow was constituted by the crystallization reactor 9 and a single hydrocyclone 2.

Sludge introduction into the crystallization reactor 9, operation of the crystallization reactor 9, and operation of the hydrocyclone were performed in a similar manner to Example 9. Sludge obtained by mixing together the sludge 6 extracted from the base portion of the crystallization reactor 9 and a part of the treated sludge flowing out from the overflow riser 5 of the hydrocyclone was supplied continuously to the hydrocyclone 2 via the hydrocyclone inflow pipe 6. The inflow rate into the hydrocyclone was set at 4 m³/hr, and the introduction pressure was set at 0.45 Mpa.

A single hydrocyclone was operated regardless of the flow rate of the raw sludge 1.

The raw sludge flow rate varied between 0.15 and 0.50 m³/hr, and the MAP concentration in the crystallization reactor 9 could not be maintained at or above 100 g/L. The raw sludge had a T—P content of 800 mg/L and a $PO_4$—P content of 300 mg/L, while the T—P content of the treated sludge varied between 350 and 450 mg/L. Since the $PO_4$—P content was substantially constant at 10 mg/L, it is believed that a large number of MAP micro-particles were precipitated when the MAP concentration in the reactor 9 decreased. Accordingly, treatment stability was lacking in comparison with Example 9.

Example 12

Examples 12 to 14 and Comparative Example 6 correspond to the embodiment described above with reference to FIGS. 12 to 14.

In Example 12, treatment was performed using a treatment flow such as that shown in FIG. 12. The excess sludge of an anaerobic/aerobic process was used as the subject organic waste matter. The treatment flow was constituted by an anaerobic digestion tank, an aeration tank serving as a decarbonation tank, a screen residue removal process, and a micro-particle separation process.

The amount of sludge introduced into the anaerobic digestion tank was set at 90 L/d. Digestion took place over twenty days at a digestion temperature of 35° C. Approximately 90 L/d of digested sludge was discharged from the digestion tank as extracted sludge. The extracted sludge was aerated to raise the pH. Aeration took place over two hours at an air intake rate of 40 L/min. In the screen residue separation process, screen residue was removed using a vibrating screen with an aperture of 2.0 mm. Following decarbonation and screen residue removal, the digested sludge was separated into digested sludge and MAP-containing micro-particles using a 4-inch hydrocyclone.

Note that the decarbonation process, screen residue separation process, and micro-particle separation process were performed as semibatch operations. The water quality in each process is shown in Table 1.

Regarding the sludge introduced to anaerobic digestion (introduced sludge hereafter), TS was 42 g/L, VS was 35 g/L, and T—P was 920 mg/L. Following extraction from the anaerobic digestion tank, the sludge (extracted sludge hereafter) had a pH of 7.2, and contained 21 g/L of TS, 17 g/L of VS, 920 mg/L of T—P, 300 mg/L of soluble $PO_4$—P, and 15 mg/L of soluble magnesium.

Following aeration of the extracted sludge to raise the pH to 8.2, the soluble magnesium concentration was measured and found to have decreased to 3 mg/L. The amount of MAP-containing micro-particles recovered in the micro-particle separation process was 1.9 g/L, of which 1.5 g/L was MAP.

After undergoing this treatment, a simulation was conducted in which the digested sludge was transferred continuously into a stainless steel pipe having an inner diameter of 130 mm. The sludge was retained in the pipe for 15 days. After approximately three months, no scale-like crystals could be found in the pipe. The amount of scale that had become adhered to a test piece provided in advance was only 2 g. Hence, it is determined that by performing the treatment described above, it is possible to prevent scale generation.

TABLE 1

| | INTRODUCED SLUDGE | EXTRACTED SLUDGE | DECARBONATED DIGESTED SLUDGE | DIGESTED SLUDGE FOLLOWING MICRO-PARTICLE SEPARATION |
|---|---|---|---|---|
| pH (-) | — | 7.2 | 8.5 | 8.5 |
| TS (g/L) | 42 | 21 | 21 | 19 |
| VS (g/L) | 35 | 17 | 17 | 17 |
| T-P (mg/L) | 920 | 920 | 920 | 720 |
| $PO_4$—P (mg/L) | — | 300 | 280 | 280 |
| Mg (mg/L) | — | 15 | 2 | 2 |
| AMOUNT OF RECOVERED MICRO-PARTICLES (g/L) | — | — | — | 1.9 |

Example 13

In this example, treatment was performed using a treatment flow such as that shown in FIG. 12. The excess sludge of an anaerobic/aerobic process was used as the subject organic waste matter. The treatment flow was constituted by an anaerobic digestion tank, decompression treatment serving as a decarbonation tank, a screen residue separation process, and a micro-particle separation process. The amount of sludge introduced into the anaerobic digestion tank was set at 90 L/d. Digestion took place over twenty days at a digestion temperature of 35° C. Approximately 90 L/d of digested sludge was discharged from the digestion tank as extracted sludge.

The extracted sludge was decompressed to raise the pH. The degree of vacuum was set at −94 kPa, and the rotation speed of the rotary body was set at 1650 rpm.

In the screen residue separation process, screen residue was removed using a vibrating screen with an aperture of 2.0 mm. Following decarbonation and screen residue removal, the digested sludge was separated into digested sludge and MAP-containing micro-particles using a 4-inch hydrocyclone.

Note that the decarbonation process, screen residue separation process, and micro-particle separation process were performed as semibatch operations. The water quality in each process is shown in Table 2.

Regarding the sludge introduced to anaerobic digestion (introduced sludge hereafter), TS was 42 g/L, VS was 35 g/L, and T—P was 920 mg/L. Following extraction from the anaerobic digestion tank, the sludge (extracted sludge hereafter) had a pH of 7.2, and contained 21 g/L of TS, 17 g/L of VS, 920 mg/L of T—P, 300 mg/L of soluble $PO_4$—P, and 15 mg/L of soluble magnesium.

Following aeration of the extracted sludge to raise the pH to 8.2, the soluble magnesium concentration was measured and found to have decreased to 3 mg/L. The amount of MAP-containing micro-particles recovered in the micro-particle separation process was 1.9 g/L, of which 1.5 g/L was MAP.

After undergoing this treatment, a simulation was conducted in which the digested sludge was transferred continuously into a stainless steel pipe having an inner diameter of 130 mm. The sludge was retained in the pipe for 15 days. After approximately three months, no scale-like crystals could be found in the pipe. The amount of scale that had become adhered to a test piece provided in advance was only 2 g. Hence, it may be determined that by performing the treatment described above, it was possible to prevent scale generation.

TABLE 2

| | INTRODUCED SLUDGE | EXTRACTED SLUDGE | DECARBONATED DIGESTED SLUDGE | DIGESTED SLUDGE FOLLOWING MICRO-PARTICLE SEPARATION |
|---|---|---|---|---|
| pH (–) | — | 7.2 | 8.2 | 8.2 |
| TS (g/L) | 42 | 21 | 21 | 19 |
| VS (g/L) | 35 | 17 | 17 | 17 |
| T-P (mg/L) | 920 | 920 | 920 | 720 |
| $PO_4$—P (mg/L) | — | 300 | 280 | 280 |
| Mg (mg/L) | — | 15 | 3 | 3 |
| AMOUNT OF RECOVERED MICRO-PARTICLES (g/L) | — | — | — | 1.9 | ation tank (aeration tank), a screen residue separation process, and a micro-particle separation process. The excess sludge was retained in the phosphorus discharge tank for one day. The anaerobic digestion tank, decarbonation tank (aeration tank), screen residue separation process, and micro-particle separation process were performed similarly to those of Example 12. The water quality in each process is shown in Table 3.

Regarding the concentrated excess sludge, TS was 42 g/L, VS was 35 g/L, T—P was 920 mg/L, $PO_4$—P was 20 mg/L, soluble Mg was 10 mg/L. At the outlet of the phosphorus discharge process, the soluble $PO_4$—P and Mg had increased to 300 mg/L and 100 mg/L, respectively. Following phosphorus discharge, the concentrated excess sludge was dewatered, whereupon the TS of the sludge was adjusted to 42 g/L using secondary waste water effluent. Following this adjustment, the sludge contained 42 g/L of TS, 35 g/L of VS, 600 mg/L of TP, 60 mg/L of $PO_4$—P, and 20 mg/L of soluble Mg.

Regarding the extracted sludge, TS was 20 g/L, VS was 17 g/L, T—P was 600 mg/L, $PO_4$—P was 180 mg/L, and soluble Mg was 20 mg/L. Following aeration of the extracted sludge to raise the pH to 8.2, the soluble magnesium concentration was measured and found to have decreased to 3 mg/L.

The amount of MAP-containing micro-particles recovered in the micro-particle separation process was 0.3 g/L, of which 0.25 g/L was MAP.

After undergoing this treatment, a simulation was conducted in which the digested sludge was transferred continuously into a stainless steel pipe having an inner diameter of 130 mm. The sludge was retained in the pipe for 15 days. After approximately three months, no scale-like crystals could be found in the pipe. The amount of scale that had become adhered to a test piece provided in advance was only 2 g. Hence, it may be determined that by performing the treatment described above, it was possible to prevent scale generation.

TABLE 3

| | INTRODUCED SLUDGE | PHOSPHORUS DISCHARGE TANK OUTLET | INTRODUCED SLUDGE (FOLLOWING TS CONCENTRATION ADJUSTMENT) | EXTRACTED SLUDGE | DECARBONATED DIGESTED SLUDGE | DIGESTED SLUDGE FOLLOWING MICRO-PARTICLE SEPARATION |
|---|---|---|---|---|---|---|
| pH (–) | — | — | — | 7.2 | 8.2 | 8.2 |
| TS (g/L) | 42 | 38 | 42 | 20 | 20 | 19 |
| VS (g/L) | 35 | 31 | 35 | 17 | 17 | 17 |
| T-P (mg/L) | 920 | 830 | 600 | 600 | 600 | 560 |
| $PO_4$—P (mg/L) | 20 | 300 | 60 | 180 | 160 | 160 |
| Mg (mg/L) | 10 | 100 | 20 | 20 | 3 | 3 |
| AMOUNT OF RECOVERED MICRO-PARTICLES (g/L) | — | — | — | — | — | 0.3 |

Example 14

Figure 33:
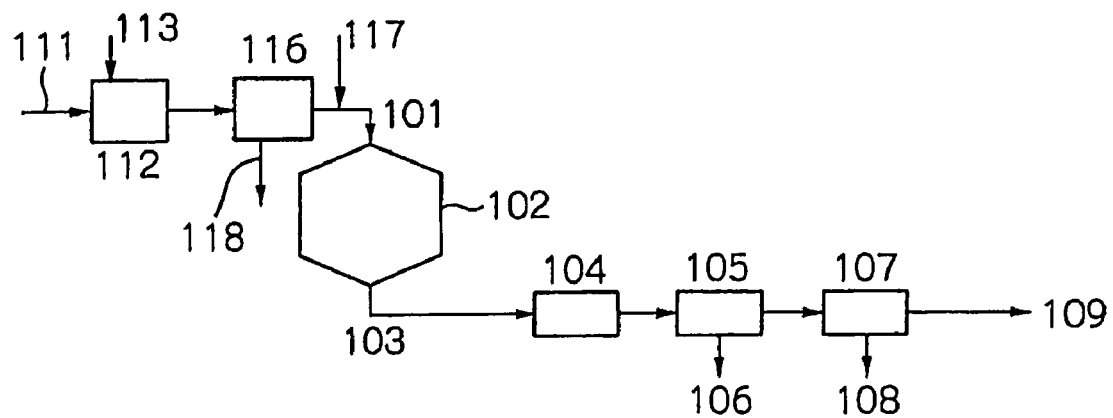
FIG. 33 is a flow diagram of apparatuses used in example 14.

In this example, treatment was performed using a treatment flow such as that shown in FIG. 33. The excess sludge of an anaerobic/aerobic process was used as the subject organic waste matter. The treatment flow was constituted by a phosphorus discharge tank, a dewatering process, a concentration adjustment process, an anaerobic digestion tank, a decarbon- Comparative Example 6

Figure 34:
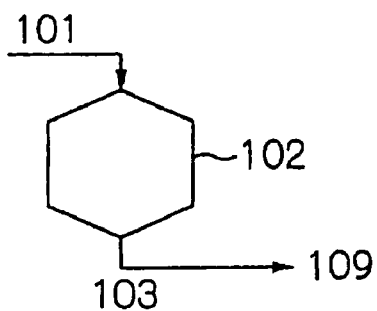
FIG. 34 is a flow diagram of apparatuses used in comparative example 6.

In the following, the results of a comparison with Example 12 will be illustrated. As shown in FIG. 34, this comparative example is identical to Example 12 except that the decarbonation process, screen residue separation process, and micro-particle separation process have been omitted. The water quality in each process is shown in Table 4.

Regarding the introduced sludge, TS was 42 g/L, VS was 35 g/L, and T—P was 920 mg/L. Regarding the extracted sludge, TS was 21 g/L, VS was 17 g/L, T—P was 920 mg/L, $PO_4$—P was 300 mg/L, and soluble Mg was 9 mg/L. After undergoing treatment, a simulation was conducted in which the digested sludge was transferred continuously into a stainless steel pipe having an inner diameter of 130 mm. The sludge was retained in the pipe for 15 days. After approximately three months, scale having a thickness of approximately 3 mm had formed on the wall surface of the pipe. The scale was subjected to component analysis using an X-ray diffraction apparatus and a fluorescent X-ray apparatus, in which the scale was found to be MAP. It is believed that the MAP was generated due to MAP accumulation in the digested sludge and pH variation caused by decarbonation and the like in the pipe.

TABLE 4

|  | INTRODUCED SLUDGE | EXTRACTED SLUDGE |
| --- | --- | --- |
| pH (−) | — | 7.2 |
| TS (g/L) | 42 | 21 |
| VS (g/L) | 35 | 17 |
| T-P (mg/L) | 920 | 920 |
| $PO_4$—P (mg/L) | — | 300 |
| Mg (mg/L) | — | 9 |
| AMOUNT OF RECOVERED MICRO-PARTICLES (g/L) | — | — |

Example 15

Example 15 and Comparative Example 7 correspond to the embodiment described above with reference to FIGS. 15 to 17.

In Example 15, treatment was performed using a treatment flow such as that shown in FIG. 15. The excess sludge of an anaerobic/aerobic process was used as the subject organic waste matter.

The treatment flow was constituted by an anaerobic digestion tank, a crystallization tank, a screen residue separation process, and a micro-particle separation process. The amount of sludge introduced into the anaerobic digestion tank was set at 90 L/d. Digestion took place over twenty days at a digestion temperature of 35° C. Approximately 90 L/d of digested sludge was discharged from the digestion tank as extracted sludge. Magnesium chloride was added to the crystallization tank to obtain an Mg/P molar ratio of 1 in relation to the orthophosphate ion concentration of the digested sludge, and a pH adjusting agent was added to adjust the pH to 8.0. Further, 7 kg of the MAP-containing micro-particles recovered in the micro-particle separation process was added as seed crystals.

A vibrating screen with an aperture of 2.0 mm was used in the screen residue separation process.

A 4-inch hydrocyclone was used in the micro-particle separation process.

Note that all processes other than that performed in the anaerobic digestion tank were performed as semibatch operations. The water quality in each process is shown in Table 5.

Regarding the sludge introduced to anaerobic digestion (introduced sludge), TS was 42 g/L, VS was 35 g/L, and T—P was 920 mg/L. Following extraction from the anaerobic digestion tank, the sludge (extracted sludge: digested sludge) had a pH of 7.2, and contained 21 g/L of TS, 17 g/L of VS, 920 mg/L of T—P, and 300 mg/L of soluble $PO_4$—P. The sludge discharged from the crystallization tank had a pH of 8.0, and contained 24 g/L of TS, 17 g/L of VS, 920 mg/L of T—P, and 10 mg/L of soluble $PO_4$—P. The amount of MAP-containing micro-particles recovered in the micro-particle separation process was 4.3 g per liter of digested sludge, of which 4.0 g was MAP. The discharged sludge had a pH of 8.0, and contained 19 g/L of TS, 17 g/L of VS, 440 mg/L of T—P, and 10 mg/L of soluble $PO_4$—P. Of the 920 mg/L phosphorus concentration introduced into the digested sludge, 480 mg/L was recovered.

TABLE 5

|  | INTRODUCED SLUDGE | EXTRACTED SLUDGE | DECARBONATED DIGESTED SLUDGE | DIGESTED SLUDGE FOLLOWING MICRO-PARTICLE SEPARATION |
| --- | --- | --- | --- | --- |
| pH (−) | — | 7.2 | 8 | 8 |
| TS (g/L) | 42 | 21 | 24 | 19 |
| VS (g/L) | 35 | 17 | 17 | 17 |
| T-P (mg/L) | 920 | 920 | 920 | 440 |
| $PO_4$—P (mg/L) | — | 300 | 10 | 10 |
| AMOUNT OF RECOVERED MICRO-PARTICLES (g/L) | — | — | — | 4.3 |

Comparative Example 7

Figure 35:
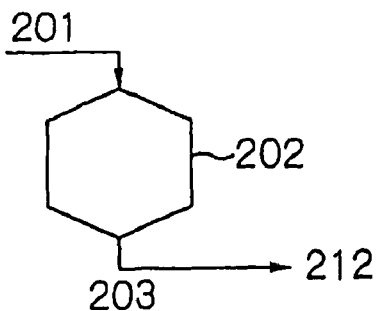
FIG. 35 is a flow diagram of apparatuses used in comparative example 7.

In the following, the results of a comparison with Example 15 will be illustrated. As shown in FIG. 35, Comparative Example 7 is identical to the Example 15 except that the crystallization process, screen residue separation process, and micro-particle separation process have been omitted. The water quality in each process is shown in Table 6.

TABLE 6

|  | INTRODUCED SLUDGE | EXTRACTED SLUDGE |
| --- | --- | --- |
| pH (−) | — | 7.2 |
| TS (g/L) | 42 | 21 |
| VS (g/L) | 35 | 17 |
| T-P (mg/L) | 920 | 920 |
| $PO_4$—P (mg/L) | — | 300 |
| AMOUNT OF RECOVERED MICRO-PARTICLES (g/L) | — | — |

Regarding the introduced sludge, TS was 42 g/L, VS was 35 g/L, and T—P was 920 mg/L. The extracted sludge contained 21 g/L of TS, 17 g/L of VS, 920 mg/L of T—P, and 300 mg/L of $PO_4$—P. The extracted sludge also contained 1.5 g/L of MAP. The MAP in the extracted sludge was not recovered, but dewatered and then incinerated.

The amount of recovered phosphorus in the comparative example described above was zero.

Example 16

In this example, sludge was treated using an identical flow to the treatment flow of FIG. 18 described above. The description relating to FIG. 18 should be referred to for details concerning this flow. The anaerobically digested sludge of a sewage treatment plant A was used as the subject sludge, and the MAP generated in this sludge was set as the subject recovered matter. The digested sludge treatment speed in this flow was set at 5 m³/day, and the operation was performed for three months.

The sieve openings of the two-stage vibrating screen 81 were set on the basis of the results of property analysis performed on the sludge of the sewage treatment plant A. The sieve opening of the upper stage sieve 81a was set at 2.0 mm, and the sieve opening of the lower stage sieve 81b was set at 0.5 mm. The separated matter (contaminants such as screen residue) 85 separated by the upper stage sieve 81a was added to MAP-separated sludge flowing out from the overflow riser 5 of the hydrocyclone 2 and the MAP-separated sludge 91 from the MAP micro-particle cleaning apparatus 82, and discharged as discharged sludge. The separated matter (particles mainly containing MAP crystals) which passed through the upper stage sieve 81a but did not pass through the lower stage sieve 81b was introduced directly into the MAP cleaning apparatus 82. The separated matter (sludge slurry containing micro-particles) which passed through the lower stage sieve 81b was guided to the MAP crystallization reactor 9, where magnesium chloride and caustic soda were added as necessary to instigate a crystallization reaction. The sludge containing MAP particles in the MAP crystallization reactor 9 was introduced appropriately into the two-inch hydrocyclone 2 through the hydrocyclone inflow pipe 6, the MAP particles concentrated by the hydrocyclone 2 were returned to the MAP crystallization reactor 9 through the return pipe 11, and a part thereof was introduced as appropriate into the MAP cleaning apparatus 82 through the particle discharge pipe 4. A drum type flowing film separation and classification apparatus was used as the MAP cleaning apparatus 82, and hence MAP particles were separated from the introduced MAP particle-containing slurry, classified, and cleaned by the cleaning water 84. Following separation and cleaning, the MAP particles were dewatered by the dewatering apparatus 83, and then recovered as the MAP crystals 89.

Figure 36:
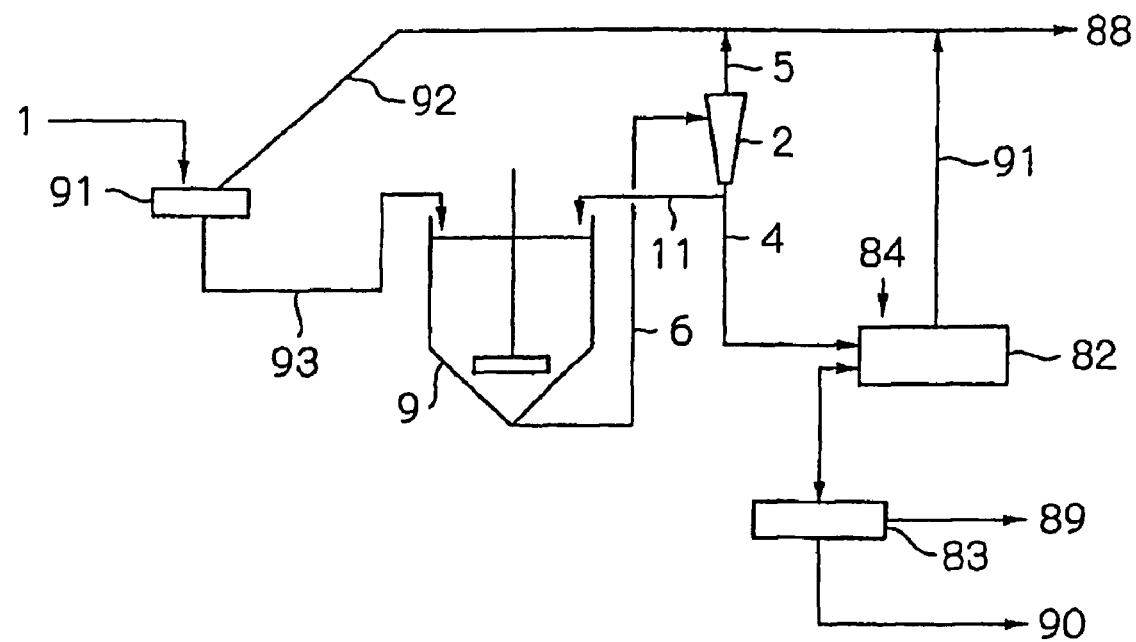
FIG. 36 is a flow diagram of a comparative flow in example 16.

As a comparative flow, identical treatment was performed on identical subject sludge using a single-stage vibrating screen. FIG. 36 shows this comparative flow. In the comparative flow shown in FIG. 36, a single-stage sieve 91 having a hole diameter of 2.0 mm was used as the vibrating screen, separated contaminants 92 such as screen residue were discharged as discharged sludge, and all of the sludge slurry 93 containing the MAP micro-particles that passed through the sieve was introduced into the crystallization reactor 9. All other conditions were identical to those of the flow shown in FIG. 18.

The results of Example 16 are shown in Table 7.

The aim of this system was to recover MAP from sewerage sludge in as large a quantity as possible but with as high a purity as possible. Accordingly, the "MAP recovery amount per liter of digested sludge" and the "recovered MAP purity" were set as the two evaluation items of the system.

With the treatment flow using a two-stage sieve shown in FIG. 18, the average MAP recovery rate was 3.9 g/L and the average recovered MAP purity was 86.6%. With the treatment flow using a single-stage sieve shown in FIG. 36, the average MAP recovery rate was 3.5 g/L and the average recovered MAP purity was 82.7%. Hence, in the flow using the two-stage sieve, the MAP recovery rate increased by 0.4 g/L, which is an increase of more than 10% over the flow using the single-stage sieve, and the MAP purity increased by 4.2% over the flow using the single-stage sieve. With the method using the single-stage vibrating screen, MAP particles grown to several millimeters or more may partially settle in the system piping or the reaction tanks, which is believed to cause a reduction in the MAP recovery rate. Moreover, micro-particles other than MAP, for example refuse and wood waste having a particle diameter of 2.0 mm or less, pass through the single-stage sieve and are introduced into the MAP crystallization reactor 9 together with the MAP particles. As a result, crystallized MAP becomes adhered to the surfaces of the non-MAP micro-particles, and these newly formed particles are recovered in the downstream MAP cleaning apparatus together with the MAP, leading to deterioration in the recovered MAP purity. Alternatively, the particles may be discarded from the recovered matter, leading to deterioration in the MAP recovery rate. With the flow using the two-stage sieve, on the other hand, the non-MAP micro-particles such as refuse and wood waste which pass through the first-stage sieve having a hole diameter of 2 mm are separated by the second-stage sieve together with the MAP particles having a large particle diameter. Since these micro-particles are transmitted directly to the MAP cleaning apparatus without passing through the crystallization reactor, they do not contribute to the reaction that takes place in the crystallization reactor. As a result, relatively favorable treatment results can be obtained in terms of both the MAP recovery rate and the MAP purity when a two-stage sieve is employed.

TABLE 7

TREATMENT RESULTS OF EXAMPLE 16

| | FLOW USING TWO-STAGE SIEVE | FLOW USING ONE-STAGE SIEVE |
|---|---|---|
| RAW SLUDGE pH (−) | 7.2-7.6 (AVERAGE 7.4) | |
| $PO_4$—P (mg/L) | 310-390 (AVERAGE 365) | |
| MAP AMOUNT (g/L) | 0.6-1.1 (AVERAGE 0.9) | |
| MAP RECOVERY RATE (g/L OF SLUDGE) | 3.5-4.3 (AVERAGE 3.9) | 2.9-3.9 (AVERAGE 3.5) |
| RECOVERED MAP PURITY (%) | 77.7-92.3 (AVERAGE 86.9) | 71.6-88.9 (AVERAGE 82.7) |

According to the present invention, during treatment for recovering phosphorus in the form of MAP particles from sludge, blockages of a particle separation apparatus such as a hydrocyclone are suppressed, and as a result, effects such as an improvement in the stability of the treatment and acquisition of MAP having a high degree of purity can be obtained. The present invention may be applied not only to treatment for recovering phosphorus in the form of MAP particles from sludge, but also to the separation and recovery of various types of crystal from various types of waste water.

What is claimed is:

1. A crystal separation apparatus for separating crystals from sludge or from separated water generated when sludge is subjected to a concentration process or a dewatering process, comprising:

a crystallization reactor for precipitating the crystals by adding a chemical to the sludge or separated water;

a hydrocyclone separating the crystals from the sludge or separated water introduced into the hydrocyclone after being treated by said crystallization reactor;

a first return pipe for returning said sludge or separated water which flows out from an overflow riser of said hydrocyclone to said crystallization reactor, and a second return pipe for returning the sludge or separated water which flows out from said overflow riser of said hydrocyclone to a sludge or separated water introduction portion of said hydrocyclone.

2. The crystal separation apparatus according to claim 1, further comprising a third return pipe for returning all or a part of said crystals separated or concentrated by said hydrocyclone to said crystallization reactor.

3. The crystal separation apparatus according to claim 2, wherein a cleaning pipe for cleaning said hydrocyclone is connected to said third return pipe.

4. The crystal separation apparatus according to claim 1, further comprising an extraction pipe for extracting crystals deposited on a base portion of said crystallization reactor to the exterior of the system such that, when an amount of the sludge or raw water to be supplied to said crystallization reactor is Q1, an amount of the chemical to be added to said crystallization reactor is Q2, an amount of the crystals separated or concentrated by said hydrocyclone to be returned to said crystallization reactor is Q3, and an amount of the crystals to be extracted by said extraction pipe is Q4, Q1+Q2+Q3<Q4.

5. The crystal separation apparatus according to claim 1, wherein a recovery pipe for recovering crystals separated or concentrated by said hydrocyclone is connected to a base portion of said hydrocyclone.

6. The crystal separation apparatus according to claim 5, wherein a cleaning pipe for cleaning said hydrocyclone is connected to said recovery pipe.

7. A crystal separation apparatus for separating crystals from sludge, or from separated water generated when sludge is subjected to a concentration process or a dewatering process, comprising:
   a crystallization reactor for precipitating the crystals by adding a chemical to the sludge or separated water;
   a plurality of hydrocyclones arranged in parallel for separating the crystals from the sludge or separated water introduced into said hydrocyclones after being treated by said crystallization reactor; and
   a return pipe for returning all or a part of said crystals separated or concentrated by said hydrocyclones to said crystallization reactor.

8. The crystal separation apparatus according to claim 7, further comprising:
   a flow meter for measuring a flow rate of the sludge or separated water disposed in a pipe for introducing the sludge or separated water into said crystallization reactor, and
   means for determining a number of said hydrocyclones to be operated from a relationship between a value measured by said flow meter, a preset flow rate range, and a number of operational hydrocyclones of said plurality of hydrocyclones.

9. The crystal separation apparatus according to claim 7, further comprising:
   a sludge concentration meter disposed in said crystallization reactor, and
   means for determining a number of hydrocyclones to be operated in accordance with a detection value of said sludge concentration meter.

10. The crystal separation apparatus according to claim 7, further comprising:
    a screen residue removal apparatus disposed upstream of said crystallization reactor or between said crystallization reactor and said hydrocyclones,
    means for monitoring a phosphorus concentration and a pH value of the sludge or separated water treated by said crystallization reactor, said hydrocyclones and said crystallization reactor;
    means for calculating a supersaturation ratio on the basis of the phosphorus concentration and the pH value measured by said monitoring means; and
    means for determining an amount of magnesium to be added and a number of hydrocyclones to be operated in accordance with the supersaturation ratio.

11. A digested sludge treatment apparatus for treating digested sludge generated by subjecting organic waste matter to anaerobic digestion, comprising:
    an apparatus for decarbonating the digested sludge;
    a removal apparatus for removing screen residue from the digested sludge, wherein said removal apparatus is a wet-type vibrating screen equipped with two or more types of sieve bodies having different hole diameters; and
    an apparatus for separating or concentrating crystals containing magnesium ammonium phosphate from the digested sludge after the digested sludge passes through said decarbonation apparatus and said removal apparatus.

12. A digested sludge treatment apparatus for treating digested sludge generated by subjecting organic waste matter to anaerobic digestion, comprising:
    a crystallization reactor for precipitating magnesium ammonium phosphate from the digested sludge;
    a removal apparatus for removing screen residue from the digested sludge, wherein said removal apparatus is a wet-type vibrating screen equipped with two or more types of sieve bodies having different hole diameters; and
    an apparatus for separating or concentrating crystals containing magnesium ammonium phosphate from the digested sludge after the digested sludge passes through said crystallization reactor and said screen residue removal apparatus.

* * * * *